United States Patent
Sasaki

(10) Patent No.: US 6,385,143 B1
(45) Date of Patent: May 7, 2002

(54) METHOD AND APPARATUS OF MULTIBEAM OPTICAL DISC READOUT

(75) Inventor: Toshihiro Sasaki, Musashimurayama (JP)

(73) Assignee: Kabushiki Kaisha Kenwood, Tokyo (JP)

(*) Notice: Subject to any disclaimer, the term of this patent is extended or adjusted under 35 U.S.C. 154(b) by 0 days.

(21) Appl. No.: 09/509,552

(22) PCT Filed: Oct. 9, 1998

(86) PCT No.: PCT/JP98/04565

§ 371 Date: Apr. 12, 2000

§ 102(e) Date: Apr. 12, 2000

(87) PCT Pub. No.: WO99/19869

PCT Pub. Date: Apr. 22, 1999

(30) Foreign Application Priority Data

Oct. 14, 1997 (JP) .............................. 9-297805

(51) Int. Cl.⁷ .............................................. G11B 17/22
(52) U.S. Cl. .................................... 369/30.1; 369/44.37
(58) Field of Search .......................... 369/32, 33, 44.28, 369/44.27, 44.37, 44.38, 44.29

(56) References Cited

U.S. PATENT DOCUMENTS

| | | | | |
|---|---|---|---|---|
| 4,494,154 A | * | 1/1985 | Akiyama | 386/70 |
| 4,539,665 A | * | 9/1985 | Iso et al. | 369/44.25 |
| 4,759,007 A | * | 7/1988 | Eberly | 369/58 |
| 5,054,013 A | * | 10/1991 | Kawamura | 369/44.28 |
| 5,457,670 A | * | 10/1995 | Maeda et al. | 369/44.28 |
| 5,483,515 A | * | 1/1996 | Cheng et al. | 369/32 |
| 5,583,836 A | * | 12/1996 | Rokutan et al. | 369/32 |
| 5,638,350 A | * | 6/1997 | Fuji | 369/32 |
| 6,144,626 A | * | 11/2000 | Naito | 369/32 |

OTHER PUBLICATIONS

Patent Abstracts of Japan, vol. 015, No. 262, Jul. 3, 1991, Publication No. JP 03 84646 Oct. 4, 1991.
Patent Abstracts of Japan, vol. 010, No. 324, Nov. 5, 1986, Publication No. JP 61 131247 Jun. 18, 1986.
Patent Abstracts of Japan, vol. 009, No. 105, May 9, 1985, Publication No. JP 59 227038 Dec. 20, 1984.
Patent Abstracts of Japan, vol. 017, No. 141, Mar. 23, 1993, Publication No. JP 04 313814 Nov. 5, 1992
Patent Abstracts of Japan, vol. 096, No. 011, Nov. 29, 1996, Publication No. JP 08 190717 Jul. 23, 1996.

* cited by examiner

*Primary Examiner*—Tan Dinh
(74) *Attorney, Agent, or Firm*—Eric J. Robinson; Nixon Peabody LLP

(57) ABSTRACT

An optical pickup applies five different light beams at the same time to every second five tracks on a signal plane of a CD-ROM. A record data read system reads record data independently for each light beam system in accordance with outputs of respective light beams reflected from the signal plane, and stores the read record data in the record order. Under the control of a system controller, the optical pickup and record data read system read the record data of the CD-ROM by alternately performing an operation of continuously reading the record data with the five light beam systems during approximately two rotations of the CD-ROM and a track jump operation by seven tracks in a forward direction after the continuous reading operation with a combination of the five light beam systems shows no omission of the record data of the CD-ROM.

6 Claims, 21 Drawing Sheets

FIG. 5

METHOD AND APPARATUS OF MULTIBEAM OPTICAL DISC READOUT

BACKGROUND OF THE INVENTION

1. Field of the Invention

The present invention relates to an optical disc read apparatus and method, and more particularly to an optical disc read apparatus and method in which different light beams are applied at the same time to a plurality of adjacent tracks of an optical disc formed with a spiral track, such CD-ROM, CD-WO, DVD, DVD-ROM, and DVD-RAM, and data recorded on the tracks applied with the light beams are read with a record data read system in accordance with a detected output of each reflected light beam.

2. Description of the Related Art

A multibeam method is one of the methods of reading record data from a CD-ROM at high speed. With this method, different light beams are applied at the same time to a plurality of adjacent tracks of an optical disc formed with a spiral track, data recorded on the tracks applied with the light beams are read with a record data read system in accordance with a detected output of each reflected light beam, and the read data are sequentially output in the record order by preventing the read data from being duplicated or omitted.

A multibeam method of reading an optical disc (CD-ROM) will be described with reference to FIG. 21. Reference numeral 1 represents an optical disc (CD-ROM) as viewed toward a signal plane (from an optical pickup side), CD-ROM being formed with a spiral track recorded with data (the outer and inner circumference sides of CD-ROM are indicated by arrows in FIG. 21). Reference numeral 2 represents an optical pickup capable of radiating five light beams, the optical pickup 2 being provided with a relative rotation to CD-ROM 1 and moved from the inner circumference to outer circumference as record data read advances. As the optical pickup 2 reaches a position I and starts reading record data, light beams $3_1$ to $3_5$ are applied at the same time to respective tracks (x−1) to (x+3) and data recorded on the tracks applied with the light beams $3_1$ to $3_5$ are read with a record data read system in accordance with a detected output of each reflected light beam.

Record data of CD-ROM 1 is formed on the basis of one frame unit (one frame=1/75 sec) represented by A-time (Absolute-time) of a sub-code Q channel, in conformity with the CD signal format. As the optical pickup 2 starts reading data from the position I shown in FIG. 21, the optical beam $3_1$ system correctly reads record data from the frame of A-time=23:40:59 or 23 minutes, 40 seconds, 59 frames, the optical beam $3_2$ system correctly reads record data from the frame of A-time=23:40:74, the optical beam $3_3$ system correctly reads record data from the frame of A-time=23:41:14, the optical beam $3_4$ system correctly reads record data from the frame of A-time=23:41:29, and the optical beam $3_5$ system correctly reads record data from the frame of A-time=23:41:44.

As CD-ROM 1 rotates generally once (slightly more than once) and the read position with the optical pickup 2 reaches a position II shown in FIG. 21 (the light beams $3_1$ to $3_5$ are applied to the tracks x to (x+4), the optical beam $3_1$ correctly reads record data up to the frame of A-time=23:40:73, the optical beam $3_2$ correctly reads record data up to the frame of A-time=23:41:13, the optical beam $3_3$ correctly reads record data up to the frame of A-time=23:41:28, and the optical beam $3_4$ correctly reads record data up to the frame of A-time=23:41:43. In this manner, there is no omission of read data by the optical beams $3_1$ to $3_5$ (at this time, the light beam $3_5$ has correctly read record data up to the frame of A-time=23:41:58). The data read by the optical beams $3_1$ to $3_5$ are output to external circuits in the record order by preventing the read data from being duplicated.

When the read position with the optical pickup 2 reaches the position II shown in FIG. 21, the optical pickup 2 is jumped forward (toward the outer circumference of CD-ROM 1) by three tracks. Namely, the optical pickup 2 is jumped to a position III shown in FIG. 21 (and the light beams $3_1$ to $3_5$ are applied to tracks (x+3) to (x+7)). Thereafter, data read starts again. Specifically, the optical beam $3_1$ system correctly reads record data from the frame of A-time=23:41:46, the optical beam $3_2$ system correctly reads record data from the frame of A-time=23:41:61, the optical beam $3_3$ system correctly reads record data from the frame of A-time=23:42:01, the optical beam $3_4$ system correctly reads record data from the frame of A-time=23:42:16, and the optical beam $3_5$ system correctly reads record data from the frame of A-time=23:42:31.

As CD-ROM 1 rotates generally once (slightly more than once) and the read position with the optical pickup 2 reaches a position IV shown in FIG. 21 (the light beams $3_1$ to $3_5$ are applied to the tracks (x+4) to (x+8), the optical beam $3_1$ system correctly reads record data up to the frame of A-time=23:41:60, the optical beam $3_2$ system correctly reads record data up to the frame of A-time=23:42:00, the optical beam $3_3$ system correctly reads record data up to the frame of A-time=23:42:15, and the optical beam $3_4$ system correctly reads record data up to the frame of A-time=23:42:30. In this manner, there is no omission of read data by the optical beams $3_1$ to $3_5$ (at this time, the light beam $3_5$ has correctly read record data up to the frame of A-time=23:42:45). The data read by the optical beams $3_1$ to $3_5$ are output to the external circuits in the record order by preventing the read data from being duplicated.

When the read position with the optical pickup 2 reaches the position IV shown in FIG. 21, the optical pickup 2 is jumped forward (toward the outer circumference of CD-ROM 1) by three tracks. Namely, the optical pickup 2 is jumped to a position V shown in FIG. 21 (and the light beams $3_1$ to $3_5$ are applied to tracks (x+7) to (3+11)). Thereafter, data read starts again. Specifically, the optical beam $3_1$ system correctly reads record data from the frame of A-time=23:42:33, the optical beam $3_2$ system correctly reads record data from the frame of A-time=23:42:48, the optical beam $3_3$ system correctly reads record data from the frame of A-time=23:42:63, the optical beam $3_4$ system correctly reads record data from the frame of A-time=23:43:03, and the optical beam $3_5$ system correctly reads record data from the frame of A-time=23:43:18.

As CD-ROM 1 rotates generally once (slightly more than once) and the read position with the optical pickup 2 reaches a position VI shown in FIG. 21 (the light beams $3_1$ to $3_5$ are applied to the tracks (x+8) to (x+12), the optical beam $3_1$ system correctly reads record data up to the frame of A-time=23:42:47, the optical beam $3_2$ system correctly reads record data up to the frame of A-time=23:42:62, the optical beam $3_3$ system correctly reads record data up to the frame of A-time=23:43:02, and the optical beam $3_4$ system correctly reads record data up to the frame of A-time=23:43:17. In this manner, there is no omission of read data by the optical beams $3_1$ to $3_5$ (at this time, the light beam $3_5$ has correctly read record data up to the frame of A-time=23:43:32). The data read by the optical beams $3_1$ to $3_5$ are output to the external circuits in the record order by preventing the read data from being duplicated.

When the read position with the optical pickup 2 reaches the position VI shown in FIG. 21, the optical pickup 2 is jumped forward (toward the outer circumference of CD-ROM 1) by three tracks. Namely, the optical pickup 2 is jumped to a position VII shown in FIG. 21 (and the light beams $3_1$ to $3_5$ are applied to tracks (3+11) to (x+15)). Thereafter, data read starts again. Specifically, the optical beam $3_1$ system correctly reads record data from the frame of A-time=23:43:20, the optical beam $3_2$ system correctly reads record data from the frame of A-time=23:43:35, the optical beam $3_3$ system correctly reads record data from the frame of A-time=23:43:50, the optical beam $3_4$ system correctly reads record data from the frame of A-time=23:43:65, and the optical beam $3_5$ system correctly reads record data from the frame of A-time=23:44:05.

As CD-ROM 1 rotates generally once (slightly more than once) and the read position with the optical pickup 2 reaches a position VIII shown in FIG. 21 (the light beams $3_1$ to $3_5$ are applied to the tracks (x+12) to (x+16), the optical beam $3_1$ system correctly reads record data up to the frame of A-time=23:43:34, the optical beam $3_2$ system correctly reads record data up to the frame of A-time=23:43:49, the optical beam $3_3$ system correctly reads record data up to the frame of A-time=23:43:64, and the optical beam $3_4$ system correctly reads record data up to the frame of A-time=23:44:04. In this manner, there is no omission of read data by the optical beams $3_1$ to $3_5$ (at this time, the light beam $3_5$ has correctly read record data up to the frame of A-time=23:44:19). The data read by the optical beams $3_1$ to $3_5$ are output to the external circuits in the record order by preventing the read data from being duplicated.

While the optical pickup 2 is given a relative rotation to CD-ROM 1 from the position I to the position II, the light beam $3_5$ system reads the record data from the frame of A-time=23:41:44 to the frame of A-time=23:41:58, whereas while the optical pickup 2 is given a relative rotation to CD-ROM 1 from the position III to the position IV, the light beam $3_1$ system reads the record data from the frame of A-time=23:41:46 to the frame of A-time=23:41:60. Therefore, record data from the frame of A-time=23:41:46 to the frame of A-time=23:41:58 is duplicated. Therefore, for the record data from the frame of A-time=23:41:46 to the frame of A-time=23:41:58, the record data previously read with the light beam $3_5$ is output and the record data read with the light beam $3_1$ is discarded.

When the track jump is performed from the position II shown in FIG. 21, the optical pickup 2 is jumped not by four tracks, but by three tracks in order to apply the light beam $3_1$ to the track (x+3) from which the record data was read with the light beam $3_5$ system immediately before the track jump. If the number of jump tracks is "4", the optical pickup 2 is jumped to a position III' shown in FIG. 21, and thereafter the light beam $3_1$ system reads record data from the frame of A-time=23:41:61. Therefore, the record data in the frames of A-time=23:41:59 and A-time=23:41:61 still not read with the light beam $3_5$ before the track jump are omitted.

Generally, high speed read of CD-ROM 1 is performed by repeating an operation of reading record data with n (n is an integer "3" or larger) light beam systems for one rotation and then making the optical pickup jump forward by (n−2) tracks.

When a track jump is performed, the focus servo system and tracking servo system are temporarily disturbed so that record data read cannot resume until these servo systems become stable.

With the conventional multibeam optical disc read method described above, if the number n of light beams is "5", it is necessary to perform a continuous read by about four rotations of CD-ROM 1 and three track jumps in order to read record data from the tracks (x−1) to (x+16) shown in FIG. 21. Since a fairly long time is necessary for each track jump, it takes a long time to read data recorded in a number of tracks.

Record data read with some light beam systems may become impossible because of a track pitch variation, surface vibration, center deviation and the like of CD-ROM 1. In such a case, the conventional optical disc read method of repeating an operation of reading record data with n (n is an integer "3" or larger) light beam systems for approximately one rotation and then making the optical pickup jump forward by (n−2) tracks, is associated with some problem. For example, if the light beam $3_2$ system shown in FIG. 21 is unable to read record data, the record data in the frames from A-time=23:40:74 to A-time=23:41:13 cannot be read during the record data read with the optical pickup 2 by approximately one rotation from the position I shown in FIG. 21.

As the optical pickup 2 reaches the position II, the track jump by three tracks to the position III is performed. Therefore, the record data in the frames from A-time=23:40:74 to A-time=23:41:13 cannot be read. Also, the record data in the frames from A-time=23:41:61 to A-time=23:42:00 cannot be read during the record data read by approximately one rotation from the position III.

As above, a problem occurs that a user cannot acquire a portion of necessary data.

SUMMARY OF THE INVENTION

It is an object of the present invention to solve the above problem and provide an optical disc read method and apparatus capable of reading data at high speed from an optical disc.

It is another object of the present invention to provide an optical disc read method and apparatus capable of acquiring necessary data even if data read with some light beams is impossible.

It is a further object of the present invention to provide an optical disc read method and apparatus capable of efficiently reading record data from an optical disc even if data read with some light beams is impossible.

In an optical disc read method according to the invention, data recorded on tracks of an optical disc formed with a spiral track is read with a record data read system by applying different light beams 1, . . . , n at the same time to n tracks at every (c+1)-th and independently detecting the light beams reflected from the optical disc, where c is an integer of 1 or larger and n is an integer of 2 or larger, and the record data of the optical disc is read by alternately performing an operation of continuously reading the record data on the tracks of the optical disc with n light beam systems and a track jump operation in a forward direction after the continuous reading operation.

The continuous reading operation may be performed during approximately (c+1) rotations of the optical disc, and the track jump operation jumps approximately {(c+1)(n−1)−1} tracks in the forward direction.

If there is a light beam system unable to read the record data of the optical disc, among the n light beam systems, the record data of the optical disc may be read by alternately performing an operation of continuously reading the record data on the tracks of the optical disc with n light beam systems during approximately (c+1) rotations and a track jump operation by approximately {(c+1)·(M−1)−1} tracks in a forward direction after the continuous reading operation, by using detection outputs from only M (M<n) adjacent record data readable light beam systems.

M is the maximum number of adjacent record data readable light beam systems among record data readable light beam systems.

Alternatively, if there is a light beam system unable to read the record data of the optical disc, among the n light beam systems and if Q is 2 or larger and R is 0 or larger, where Q is the number of tracks representing a distance between the innermost light beam and outermost light beam among record data readable light beam systems and R is the maximum number of adjacent record data unreadable light beams between the innermost and outermost record data readable light beams, the record data of the optical disc may be read by alternately performing an operation of continuously reading the record data on the tracks of the optical disc with the record data readable light beam systems during approximately {(R+1)·(c+1)} and a track jump operation by approximately (Q−1) tracks in a forward direction after the continuous reading operation with a combination of the record data readable light beam systems shows no omission of the record data of the optical disc.

The record data detected from the tracks of the optical disc during the continuous reading operation may be stored together with frame addresses, and the track jump operation may be performed when a frame address corresponding to the record data read with the i-th light beam becomes continuous with a continuous data read start frame address corresponding to the record data to be read with the adjacent (i+1)-th light beam.

According to another aspect of the optical disc read method of this invention, data recorded on tracks of an optical disc formed with a spiral track is read with a record data read system by applying different light beams at the same time to n tracks at every (c+1)-th and independently detecting the light beams reflected from the optical disc, where c is an integer of 1 or larger and n is an integer of 2 or larger; a system capable of reading the record data from the optical disc is detected from n light beam systems by applying the light beams to predetermined positions of the tracks of the optical disc at a start of a continuous data reading operation and continuously reading the record data; and each light beam is set so that one of the detected record data readable systems is applied to a read start track frame.

After each light beam is set so that one of the detected record data readable systems is applied to a read start track frame, the record data of the optical disc may be read by alternately performing an operation of continuously reading the record data during a predetermined number of rotations of the optical disc and a track jump operation by a predetermined number of tracks, the rotation number and the track number being determined in accordance with the number and layout of the record data readable systems.

The predetermined positions of the tracks of the optical disc may be positions more in a backward direction than the read start track frame.

In an optical disc read apparatus embodying the optical disc read method, record data reading means includes a memory for storing the record data obtained during the continuous reading operation and a corresponding frame address, and read control means performs the track jump operation when a frame address corresponding to the record data read with the i-th light beam becomes continuous with a continuous data read start frame address corresponding to the record data to be read with the adjacent (i+1)-th light beam.

According to the invention, since the continuous read of an optical disc is performed approximately during (c+1) rotations, the number of track jumps which take a long process time can be reduced so that record data of the optical disc in a desired area can be read quickly.

Even if the record data cannot be read with some light beam systems because of a track pitch variation, surface vibration, center deviation and the like of an optical disc, desired data of the optical disc can be read reliably and quickly with some or all the remaining record data readable light beam systems by preventing the record data from being omitted.

BRIEF DESCRIPTION OF THE DRAWINGS

FIG. 5 is a diagram illustrating an example of the contents of the memory shown in FIG. 2.

FIGS. 20-1 and 20-2 are diagrams showing the structure of optical pickups according to another embodiment of the invention.

DETAILED DESCRIPTION OF THE PREFERRED EMBODIMENTS

Next, an embodiment of the invention will be described with reference to FIG. 1.

Figure 1:
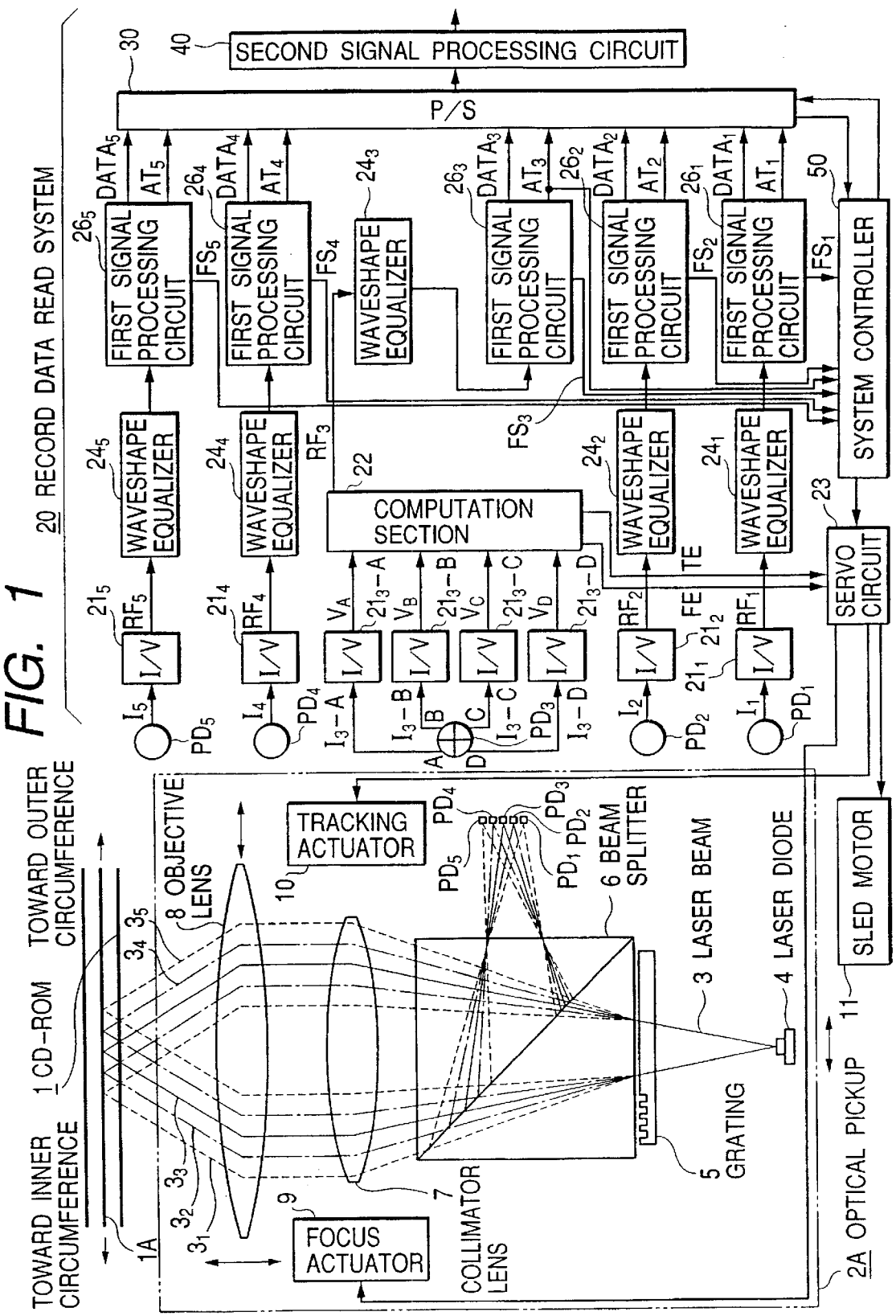
FIG. 1 is a block diagram of a CD-ROM read apparatus embodying an optical disc read method according to an embodiment of the invention.
Figure 21:
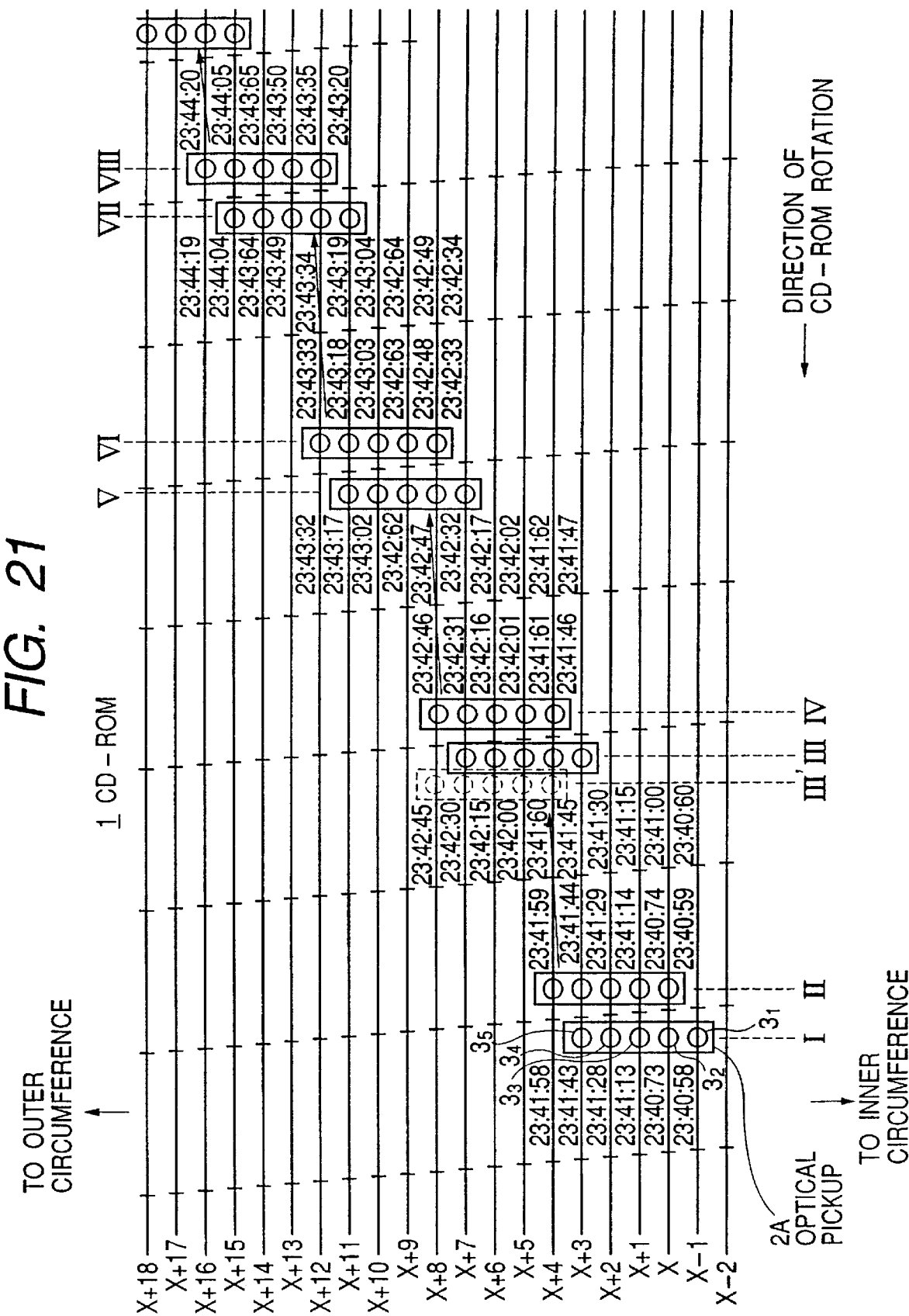
FIG. 21 is a diagram illustrating a multibeam optical disc read method.

FIG. 1 is a block diagram of a CD-ROM read apparatus embodying an optical disc read method according to an embodiment of the invention. In FIG. 1, like elements to those shown in FIG. 21 are represented by using identical reference numerals and characters.

Referring to FIG. 1, reference numeral 1 represents a CD-ROM formed with a spiral track recorded with data (the outer and inner circumference sides of CD-ROM are indicated by arrows in FIG. 1). CD-ROM 1 is rotated at a constant linear velocity with an unrepresented spindle motor. Reference numeral 2 represents an optical pickup of a multibeam type. The optical pickup 2 applies light beams $3_1$ to $3_n$ (n is the total number of tracks applied with light beams) at the same time to every (c+1)-th tracks of CD-ROM 1, each reflected light beam is detected (received) with photodetectors $PD_1$ to $PD_n$ which output photocurrents as detection signals. c is an integer of "1" or larger and n is an integer of "3" or larger. It is assumed here by way of example that c=1 and n=5 (refer to FIG. 4).

In the optical pickup 2, reference numeral 4 represents a laser diode for radiating a laser beam 3. Reference numeral 5 represents a grating (diffraction grating) for diffracting the laser beam to form a −2 order diffraction light beam $3_1$, a −1 order diffraction light beam $3_2$, a 0 order diffraction light beam $3_3$, a +1 order diffraction light beam $3_4$, and a +2 order diffraction light beam $3_5$. Reference numeral 6 represents a beam splitter made of two rectangular prisms glued together. Reference numeral 7 represents a collimator lens for converting each diffused light beam into a collimated light beam. Reference numeral 8 represents an objective lens for focussing the light beams $3_1$ to $3_5$ passed through the beam splitter 6 and collimator lens 7 onto a signal plane 1A of CD-ROM 1. Reference numeral 9 represents a focus actuator for moving the objective lens 8 along a direction perpendicular to the signal plane Al of CD-ROM 1 to follow a surface vibration of CD-ROM 1, in order to maintain an in-focus state of the light beam $3_1$ to $3_5$ relative to the signal plane 1A irrespective of surface vibrations of CD-ROM 1. Reference numeral 10 represents a tracking actuator for moving the objective lens 8 along a radial direction of the signal plane Al of CD-ROM 1 to follow a center deviation of CD-ROM 1, in order to make each light beam $3_1$ to $3_5$ correctly trace a corresponding track. The focus actuator 9 and tracking actuator 10 are independently driven by a servo circuit to be described later.

The photodetectors $PD_1$ to $PD_5$ are provided in correspondence with the light beams $3_1$ to $3_5$, and each outputs a photocurrent proportional to a received light amount. The light beams $3_1, 3_2, 3_4,$ and $3_5$ reflected from the signal plane A of CD-ROM 1 pass through the objective lens 8 and collimator lens 7 and are reflected by the beam splitter 6. Thereafter, they pass through an optical system (not shown) including a cylindrical lens, a detector lens and the like and become incident upon the corresponding photodetectors $PD_1, PD_2, PD_4,$ and $PD_5$. The photodetectors $PD_1, PD_2, PD_4,$ and $PD_5$ output photocurrents $I_1, I_2, I_4,$ and $I_5$ proportional to received light amounts, as detected outputs of the respective light beams $3_1, 3_2, 3_4,$ and $3_5$. The photodetector $PD_3$ is a four-division photodiode similar to that used for an optical pickup of the ordinary one beam type, and outputs photocurrents $I_3$-A, $I_3$-B, $I_3$-C, and $I_3$-D proportional to received light amounts of respective division diodes.

Reference numeral 11 represents a sled motor for moving the optical pickup 2 in the radial direction of CD-ROM 1 during a read or search operation. The sled motor is driven with the servo circuit and moves the optical pickup 2 to a desired position along a forward or reverse direction during the search operation, or gradually moves the optical pickup 2 along the forward direction during the read operation as the read operation of CD-ROM 1 advances.

Reference numeral 20 represents a record data read system which reads at the same time the record data recorded on the tracks applied with the light beams $3_1$ to $3_5$, from the light reception outputs of the photodetectors $PD_1$ to $PD_5$ of the optical pickup 2, and serially outputs the read record data in the record order of CD-ROM 1 by preventing the read record data from being duplicated or omitted. In the record data read system 20, current/voltage converters (I/V) $21_1$, $21_2, 21_4,$ and $21_5$ convert the photocurrents $I_1, I_2, I_4,$ and $I_5$ output from the photodetectors $PD_1, PD_2, PD_4,$ and $PD_5$ into RF voltage signals $RF_1, RF_2, RF_4,$ and $RF_5$ corresponding to the light beams $3_1, 3_2, 3_4,$ and $3_5$ and output them. Current/voltage converters (I/V) $21_3$-A, $21_3$-B, $21_3$-C, and $21_3$-D convert the photocurrents $I_3$-A, $I_3$-B, $I_3$-C, and $I_3$-D output from the photodetector $PD_3$ into voltage values $V_A, V_B, V_C,$ and $V_D$ and output them.

Reference numeral 22 represents a computation section which performs an arithmetic operation of $(V_A+V_B+V_C+V_D)$ to output an RF signal $RF_3$ corresponding to the light beam $3_3$, an arithmetic operation of $(V_A+V_C)-(V_B+V_D)$ to output a focus error signal FE, and an arithmetic operation of $(V_A+V_B)-(V_C+V_D)$ to output a tracking error signal TE. Reference numeral 23 represents the servo circuit for performing a focus servo control, a tracking servo control, and a sled servo control. In accordance with the focus error signal FE, the focus actuator 9 is driven so as to make FE zero and focus the light beams $3_1$ to $3_5$ upon the signal plane 1A, and in accordance with the tracking error signal TE, the tracking actuator 10 is driven to make TE zero and make (on-track) the light beams $3_1$ to $3_5$ trace the corresponding tracks.

Reference numerals $24_1$ to $24_5$ represent waveshape equalizers for increasing the high frequency components of the RF signals $RF_1$ to $RF_5$ to thereby compensate for high frequency attenuation to be caused by the spatial transmission frequency (MTF) characteristics of the light beams $3_1$ to $3_5$ and suppress the generation of inter-code interference. The RF signal $RF_3$ input to the waveshape equalizer $24_3$ or the RF signal $RF_3$ output from the waveshape equalizer $24_3$ is input to the servo circuit 23. The servo circuit 23 activates the focus servo control upon judgement of a timing when the value of the focus error signal FE enters a negative feedback region of the focus servo control during a focus search operation. The servo circuit 23 activates the tracking servo control upon judgement of a timing by using the RF signal $RF_3$ when the light beam $3_3$ enters the negative region of the tracking servo control.

Figure 2:
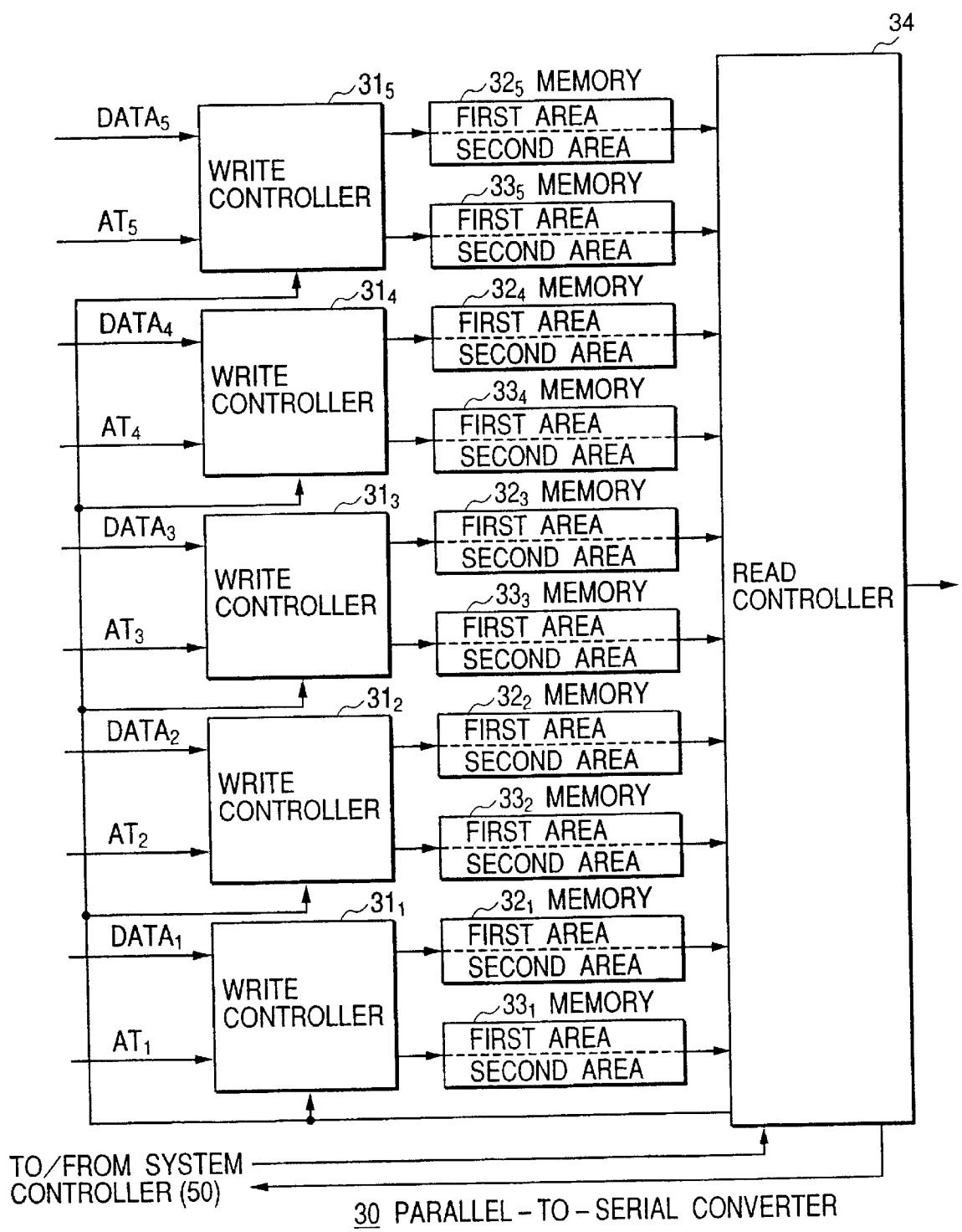
FIG. 2 is a block diagram showing the structure of a parallel-to-serial converter shown in FIG. 1.

Reference numerals $26_1$ to $26_5$ represent first signal processing circuits for performing binarization, clock recovery using PLL circuits, bit demodulation, frame sync detection, EFM demodulation, and sub-code demodulation, by using the RF signals $RF_1$ to $RF_5$, and outputting data $DATA_1$ to $DATA_5$ (inclusive of P, Q parities) after the EFM demodulation on the basis of one block unit (unit of 98 frames completing one sub-code frame), together with corresponding A-time data $AT_1$ to $AT_5$ of the sub-code Q channel. The first signal processing circuits $26_1$ to $26_6$ serially output the demodulated data $DATA_1$ to $DATA_5$ one symbol (8 bits) after another. Upon detection of frame sync, the first signal processing circuits $26_1$ to $26_5$ output frame sync detection signals $FS_1$ to $FS_5$ of H level to a system controller to be described later. These frame sync detection signals $FS_1$ to $FS_5$ are used for judging whether data can be read or not for the respective light beam $3_1$ to $3_5$ systems. A-time data $AT_3$ output from the first signal processing circuit 263 is also input to the system controller. The first signal processing circuit $26_3$ for the RF signal $RF_3$ system includes a CLV control circuit (not shown) for making the frame sync signal be detected at a predetermined time interval. The CLV control circuit performs a CLV control of an unrepresented spindle motor drive circuit to rotate CD-ROM 1 at a constant linear velocity. Reference numeral 30 represents a parallel-to-serial converter (P/S) for receiving in parallel data of one block unit output from the first signal processing circuits $26_1$ to $26_5$ and serially outputting them in the record order by preventing the data from being duplicated or omitted. The specific structure of the P/S converter 30 is shown in FIG. 2. In FIG. 2, reference numerals $32_1$ to $32_5$ represent memories each having two storage areas, a first area and a second area, and provided in correspondence with a corresponding one of the first signal processing circuits $26_1$ to $26_5$. The data $DATA_1$ to $DATA_5$ output from the first signal processing circuits $26_1$ to $26_5$ are stored in ones of the first and second areas. Each of the first and second areas has a capacity allowing the data $DATA_1$ to $DATA_5$ of a sufficient number of block units to be stored therein. Reference numerals $33_1$ to $33_5$ represent memories each having two storage areas, a first area and a second area, and provided in correspondence with a corresponding one of the first signal processing circuits $26_1$ to $26_5$. The A-time data $AT_1$ to $AT_5$ output from the first signal processing circuits $26_1$ to $26_5$ are stored in ones of the first and second areas, together with start addresses $A_{1S}$ to $A_{5S}$ (or $a_{1s}$ to $a_{5s}$) and end addresses $A_{1e}$ to $A_{5e}$ (or $a_{1e}$ to $a_{5e}$) indicating the location of the corresponding data $DATA_1$ to $DATA_5$ in the memories $32_1$ to $32_5$. Each of the first and second areas has a capacity allowing the A-time data $AT_1$ to $AT_5$ of a sufficient number of data sets to be stored therein.

Reference numerals $31_1$ to $31_5$ represent write controllers provided in correspondence with the first signal processing circuits $26_1$ to $26_5$. The write controllers $31_1$ to $31_5$ control to write the data $DATA_1$ to $DATA_5$ output from the first signal processing circuits $26_1$ to $26_5$ in the first or second areas of the memories $32_1$ to $32_5$, and to write the A-time data $AT_1$ to $AT_5$ in the first or second areas of the memories $32_1$ to $32_5$ together with the start addresses $A_{1S}$ to $A_{5S}$ (or $a_{1s}$ to $a_{5s}$) and end addresses $A_{1e}$ to $A_{5e}$ (or $a_{1e}$ to $a_{5e}$) indicating the location of the corresponding data $DATA_1$ to $DATA_5$ in the memories $32_1$ to $32_5$.

Figure 3:
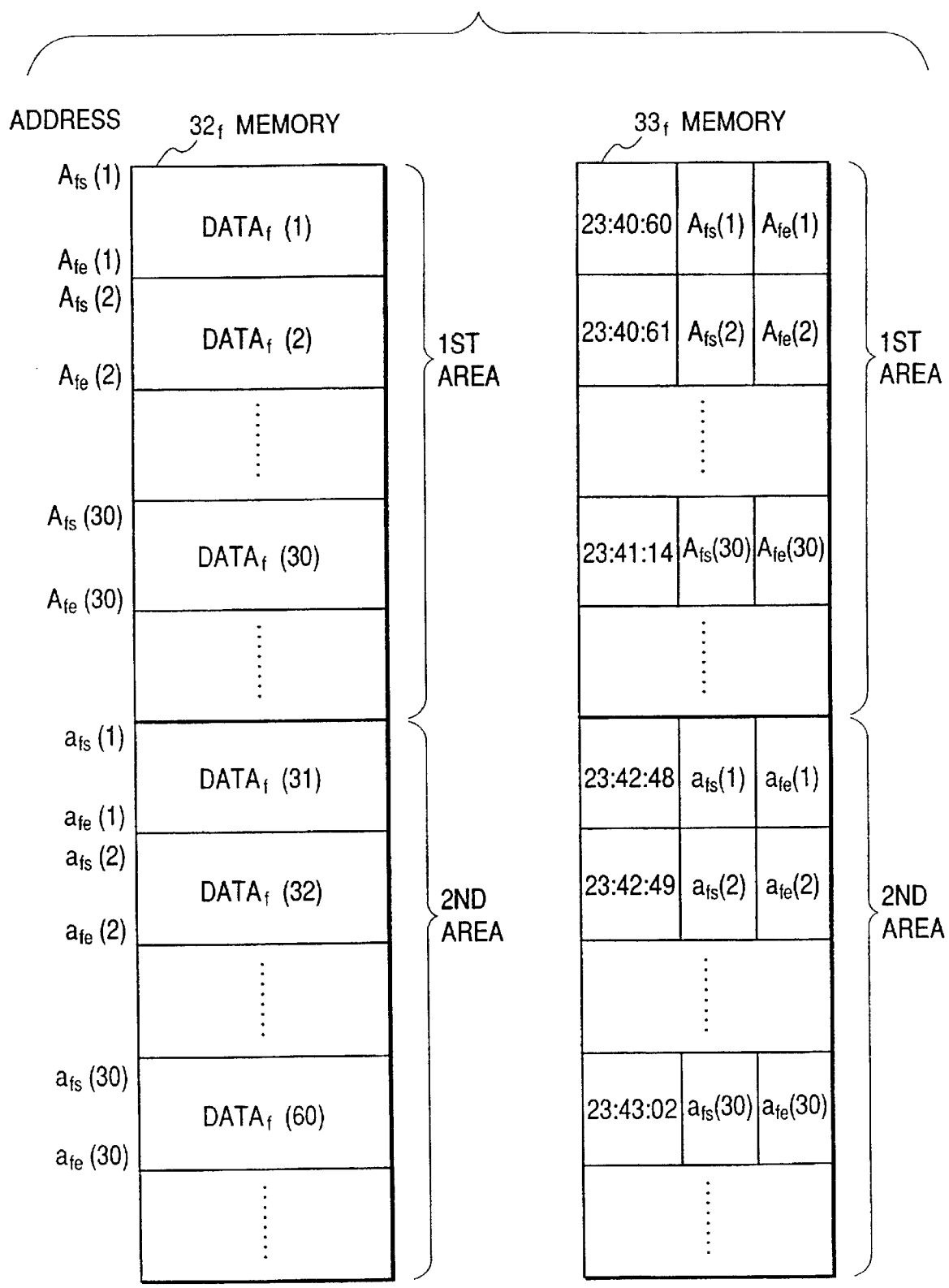
FIG. 3 is a diagram illustrating an example of the contents of a memory shown in FIG. 2.

The contents of memories $32_f$ and $33_f$ (where f=1 to 5) are shown in FIG. 3. In this example, a write controller $31_f$ controls to write 15 blocks of each set of data $DATA_f(1)$ to $DATAf(30)$ in the first area, and to write 15 blocks of each set of data $DATAf(31)$ to $DATAf(60)$ in the second area. In the first area of the memory $33_f$ the A-time data for each block of the data $DATA_f(1)$ to $DATAf(30)$ are written as, for example, frames of 23:40:60 to 23:41:14, together with a start address $A_{fs}(1)$ and an end address $A_{fe}(1)$ to a start address $A_{fs}(30)$ and an end address $A_{fe}(30)$ indicating the location of the corresponding data $DATA_f(1)$ to $DATA_f(30)$ in the first area of the memory $32_f$. In the second area of the memory $33_f$, the A-time data for each block of the data $DATA_f(31)$ to $DATA_f(60)$ are written as, for example, frames of 23:42:48 to 23:43:02, together with a start address $A_{fs}(1)$ and an end address $A_{fe}(1)$ to a start address $A_{fs}(30)$ and an end address $A_{fe}(30)$ indicating the location of the corresponding data $DATA_f(31)$ to $DATA_f(60)$ in the second area of the memory $32_f$.

Reference numeral 34 represents a read controller. With reference to the A-time data and the start addresses $A_{1S}$ to $A_{5S}$ (or $a_{1s}$ to $a_{5s}$) and end addresses $A_{1e}$ to $A_{5e}$ (or $a_{1e}$ to $a_{5e}$) stored in the memories $33_1$ to $33_5$, the read controller 34 reads the data $DATA_1$ to $DATA_5$ stored in the memories $33_1$ to $33_5$ by preventing the data from being duplicated or omitted, and serially outputs the data one symbol after another in the record order (A-time order) of CD-ROM 1. Specific operations of the write controllers $31_1$ to $31_5$ and read controller 34 will be later described.

Returning back to FIG. 1, reference numeral 40 represents a second signal processing circuit. The second signal processing circuit 40 receives the data serially output from the P/S converter 30, descrambles the data in the unit of one block, and thereafter demodulates Lch and Rch data in conformity with the CD-DA specification through error detection/correction based on CIRC codes (error detection/ correction with P parities, deinterleaveing, error detection/ correction with Q parities). The second signal processing circuit 40 then demodulates the CD-ROM data from the Lch and Rch data by performing sync detection, descrambling, header detection, and error detection/correction with EDC and ECC codes in accordance with the CD-ROM specification, and thereafter outputs the CD-ROM data to an external host computer.

Reference numeral 50 represents a system controller made of a microcomputer. For the search operation, the system controller 50 operates to supply a search command to the servo circuit 23, and to drive the sled motor 11 for the search operation to thereby move the optical pickup 2 along the forward or reverse direction of CD-ROM 1 to a desired position. For the read operation, the system controller 50 operates to supply various servo-on commands to the servo circuit 23, and to focus the light beams $3_1$ to $3_5$ upon the signal plane 1A of CD-ROM 1 to thereby trace the every (c+1)-th tracks (n=5). Each time record data is read from each track during a proper number of rotations of two or three or more, the system controller 50 supplies the servo circuit 23 with a track jump command of jumping the optical pickup by a predetermined number of tracks in the forward direction.

At the start of a read operation, the system controller 50 monitors the frame sync detection signals $FS_1$ to $FS_5$ input from the first signal processing circuits $26_1$ to $26_5$, during one rotation of CD-ROM 1, to check whether or not any system of the light beams $3_1$ to $3_5$ cannot read record data because of a track pitch variation, surface vibration, center deviation and the like of CD-ROM 1. If all the frame sync detection signals $FS_1$ to $FS_5$ are H and there is no system unable to read record data, the system controller supplies a general read/write command to the P/S converter 30 to thereby read/write data output from the first signal processing circuit $26_1$ to $26_5$ to and from the memories $32_1$ to $32_5$.

If the frame sync detection signal for one or a plurality of light beams is L for a predetermined time (e.g., 1/75 sec or longer) and data cannot be read, light beams $3_i$, $3_j$, $3_k$, ... to be used for the data read are selected from the light beams $3_1$ to $3_5$, and a specific read/write command including read system information "i, j, k, ... " indicating the light beam systems to be used for the data read is supplied to the P/S converter 30 to thereby read/write data $DATA_i$, $DATA_j$, $DATA_k$, ... output from the first signal processing circuit $26_i$, $26_j$, $26_k$, ... among the first signal processing circuits $26_1$ to $26_5$ to and from the memories $32_1$ to $32_5$.

The general read/write command or specific read/write command output from the system controller 50 is input to the read controller 34 of the P/S converter 30 and transferred from the read converter 34 to the write controllers $31_1$ to $31_5$. Upon reception of the general read/write command at the start of the data read, the write controllers $31_1$ to $31_5$ control to write the data $DATA_1$ to $DATA_5$ output from all the first signal processing circuits $26_1$ to $26_5$ first in the first areas of the memories $32_1$ to $32_5$. Upon reception of an intercept command from the read controller 34, the read operation is intercepted until a resume command is received, and then the data is written in the second areas. Similarly, when the intercept command is received thereafter, the read operation is intercepted, and when the resume command is received, data is written in the areas not used at the preceding time.

If the write controllers $31_1$ to $31_5$ receive the specific read/write command at the start of the data read, only the write controllers $31_i$, $31_j$, $31_k$, . . . indicated by the read system information "i, j, k, . . . " operate to write the data $DATA_i$, $DATA_j$, $DATA_k$, . . . output from the first signal processing circuits $26_i$, $26_j$, $26_k$, . . . first in the first areas of the memories $32_i$, $32_j$, $32_k$, . . . Upon reception of the intercept command from the read controller 34, the read operation is intercepted until the resume command is received, and then the data is written in the second areas. Similarly, when the intercept command is received thereafter, the read operation is intercepted, and when the resume command is received, data is written in the areas not used at the preceding read cycle.

After receiving the general read/write command (specific read/write command) from the system controller 50, the read controller 34 supplies the intercept command to the write controllers $31_1$ to $31_5$ ($31_i$, $31_j$, $31_k$. . . ) and a jump command to the system controller 50, when all A-time data become continuous without omission in the areas among the memories $33_1$ to $33_5$ ($33_i$, $33_j$, $33_k$, . . . ) where data were written by the write controllers $31_1$ to $31_5$ ($31_i$, $31_j$, $31_k$, . . . ) at the present read cycle. With reference to the A-time data and the start and end addresses stored in the areas among the memories $33_1$ to $33_5$ ($33_i$, $33_j$, $33_k$, . . . ) where data were written at the present read cycle, the read controller 34 controls to read and output record data in the order of A-time starting from the oldest A-time, relative to the data stored in the areas among the memories $33_1$ to $33_5$ ($33_i$, $33_j$ $33_k$, . . . ) where data were written at the present read cycle.

Thereafter, upon reception of a jump completion notice from the system controller 50, the read controller 34 supplies the resume command to the write controllers $31_1$ to $31_5$ ($31_i$, $31_j$, $31_k$, . . . ). Thereafter, the read controller 34 supplies the intercept command to the write controllers $31_1$ to $31_5$ ($31_i$, $31_j$, $31_k$, . . . ) and the jump command to the system controller 50, when all A-time data become continuous without omission in the areas among the memories $33_1$ to $33_5$ ($33_i$, $33_j$, $33_k$, . . . ) not used at the preceding read cycle. With reference to the A-time data and the start and end addresses stored in the areas among the memories $33_1$ to $33_5$ ($33_i$, $33_j$, $33_k$, . . . ) not used at the preceding read cycle, the read controller 34 controls to read and output record data in the order of A-time starting from the A-time next to the A-time corresponding to the one block data lastly output to the second signal processing circuit at the preceding read cycle, relative to the data stored in the areas among the memories $33_1$ to $32_5$ ($32_i$, $32_j$, $32_k$, . . . ) not used at the preceding read cycle. Similar operations are repeated thereafter.

The operation of the embodiment will be described with reference to FIGS. 4 to 19. It is herein assumed that CD-ROM 1 rotates at a constant linear velocity under CLV control and the focus servo is turned on, and that different light beams $3_1$ to $3_5$ are applied at the same time to every (c+1)-th tracks (n=5) of CD-ROM 1.

(1) Judgement of Unreadable System

When an unrepresented host computer designates a read start point of CD-ROM 1 as a frame having A-time, for example, 23:41:0, the system controller 50 determines the position of the track containing the read start A-time frame of CD-ROM 1, the read start point being represented by x (refer to FIGS. 4, 6, 8, 10–12, 14–16, and 18). The system controller 50 first supplies the search command to the servo circuit 23 to move the optical pickup 2 so that the light beam $3_1$ reaches the position of the track (x–8). Thereafter, the system controller 50 supplies a tracking servo-on command and a sled servo-on command to the servo circuit 23 to activate the tracking servo and sled servo. Therefore, the light beams $3_1$ to $3_5$ radiated from the optical pickup 2 are focussed on the tracks (x–8), (x–6), (x–4), (x–2) and x in an track-on state (refer to I in FIGS. 4, 6, 8, 10–12, 14–16, and 18).

The light beams $3_1$ to $3_5$ reflected by the signal plane 1A are received by the photodetectors $PD_1$ to $PD_5$ which output photocurrents $I_1$ to $I_5$ Of these photocurrents, the photocurrents $I_1$, $I_2$, $I_4$, and $I_5$ output from the photodetectors $PD_1$, $PD_2$, $PD_4$, and $PD_5$ are-converted into RF signals $RF_1$, $RF_2$, $RF_4$, and $RF_5$ by the current-to-voltage converters $21_1$, $21_2$, $21_4$, and $21_5$ which are waveshape equalized by the waveshape equalizers $24_1$, $24_2$, $24_4$, and $24_5$ and input to the first signal processing circuits $26_1$, $26_2$, $26_4$, and $26_5$. Photocurrents $I_3$-A to $I_3$-D from the photodetector $PD_3$ are converted into voltage values $V_A$ to $V_D$ by the current-to-voltage converters $21_3$-A to $21_3$-D and added together by the computation section 22 to generate an RF signal $RF_3$. The RF signal $RF_3$ is waveshape equalized by the waveshape equalizer $24_3$ and input to the first signal processing circuit $26_3$.

The first signal processing circuits $26_1$ to $26_5$ make the input RF signals $RF_1$ to $RF_5$ be subjected to binarization, clock recovery using PLL circuits, bit demodulation, frame sync detection, EFM demodulation, and sub-code demodulation, and outputs data $DATA_1$ to $DATA_5$ (inclusive of P, Q parities) after the EFM demodulation on the basis of one block unit, together with corresponding A-time data $AT_1$ to $AT_5$ of the sub-code Q channel. The first signal processing circuits $26_1$ to $26_6$ serially output the demodulated data $DATA_1$ to $DATA_5$ one symbol (8 bits) after another. Upon detection of the frame sync signals, the first signal processing circuits $26_1$ to $26_6$ output the frame sync detection signals $FS_1$ to $FS_6$ of H level to the system controller 50.

After the light beams $3_1$ to $3_5$ from the optical pickup 2 are focussed onto the tracks (x–8), (x–6), (x–4), (x–2), and x in the on-track state by the search operation, the system controller monitors the frame sync detection signals $FS_1$ to $FS_5$ input from the first signal processing circuits $26_1$ to $26_6$ to judge a presence/absence of a record data unreadable system, depending upon whether there is a system taking the L level for a predetermined time (in this example, one block=1/75 sec or longer) during one rotation of CD-ROM 1.

Figure 4:
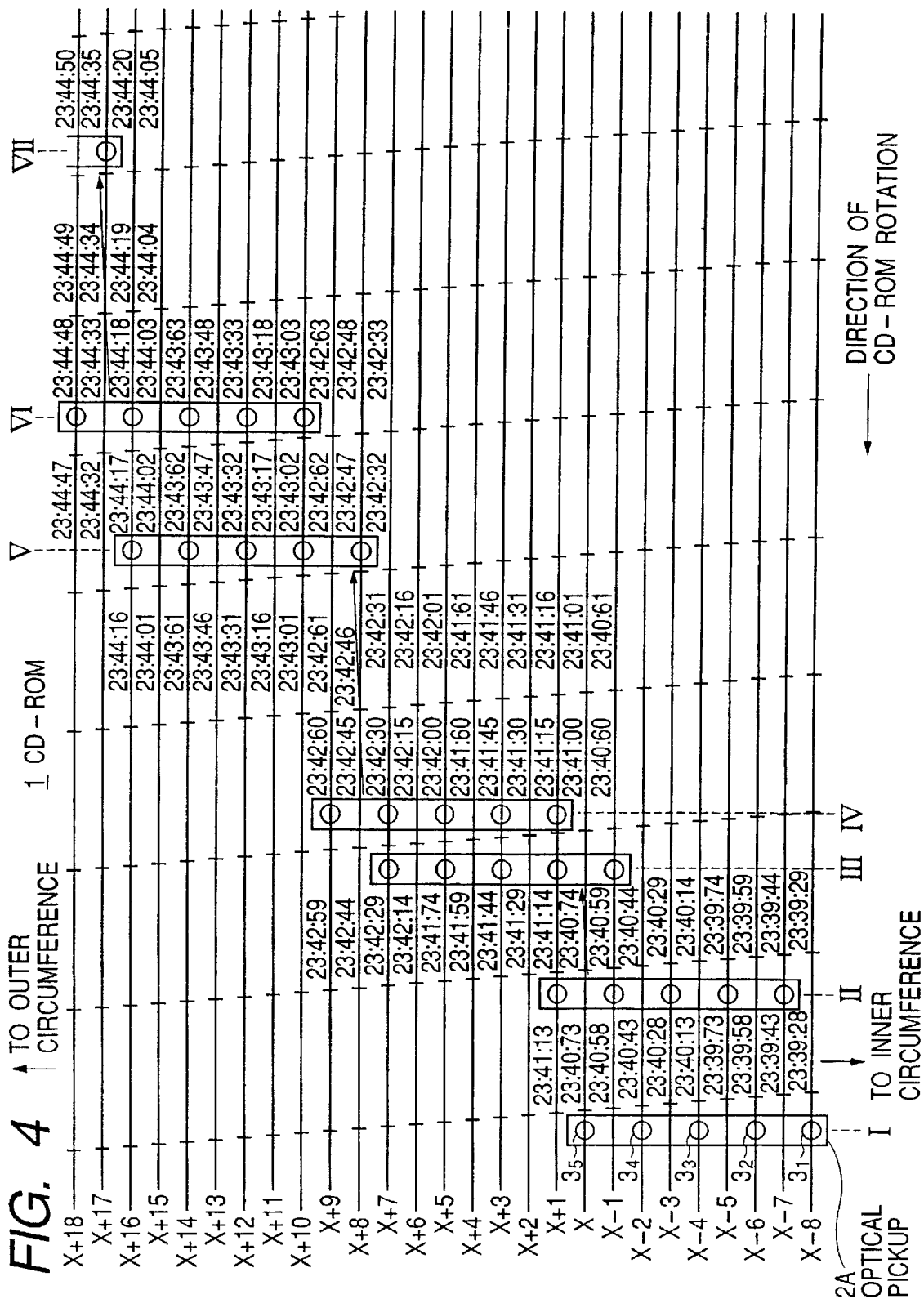
FIG. 4 is a diagram illustrating an example of a data read operation of the CD-ROM read apparatus shown in FIG. 1.
Figure 5:
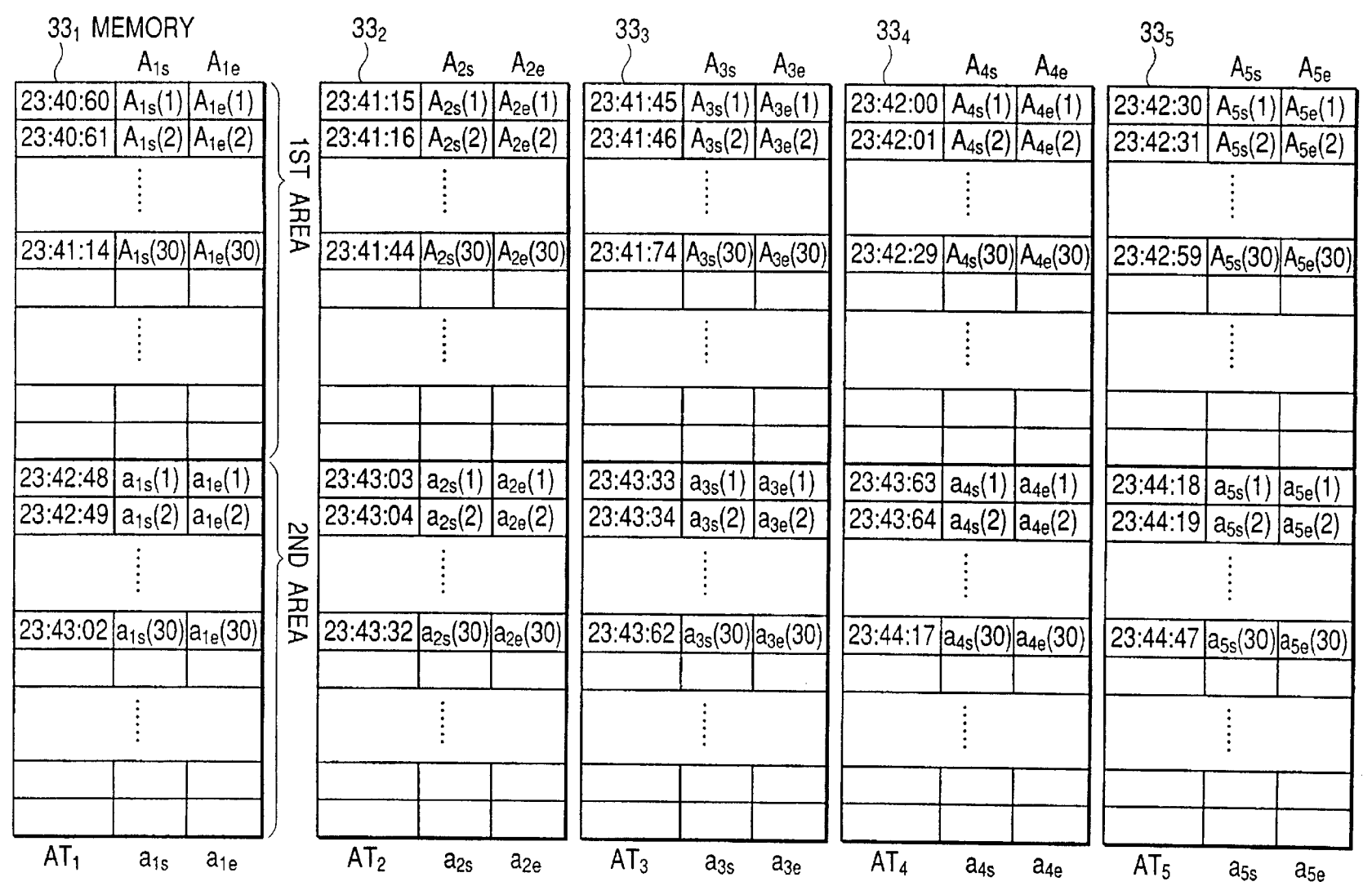

(2) General Read/write Operation (Refer to FIGS. 4 and 5).

First, the description will be given for the case wherein record data can be read with all the light beam $3_1$ to $3_5$ systems.

If the judgement of a presence/absence of a record data unreadable system shows that there is no record data unreadable system, as the read systems of h light beams, all the five light beams $3_1$ to $3_5$ are allocated. A continuous read rotation number I is set as I=(c+1)=2, and a read track jump number J is set to J={(c+1) (c−1)−1}=7. In accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=5 read light beams is focussed in the track-on state on the track (x−1) one track inner than the track x containing the read start point of the A-time.

If the optical pickup 2 is at a position II shown in FIG. 4 after the h read light beam systems are allocated and the continuous read number I and read track jump number J are set, the optical pickup 2 is jumped from the position II by six tracks in the forward direction so that the light beams $3_1$ to $3_5$ are focussed in the track-on state on the tracks (x−1), (x+1), (x+3), (x+5), and (x+7) (refer to III in FIG. 4). Then, reading the record data on the tracks (x−1), (x+1), (x+3), (x+5), and (x+7) at the same time starts, by using five systems including the photodetector $PD_1$ to first signal processing circuit $26_1$, photodetector $PD_2$ to first signal processing circuit $26_2$, photodetector $PD_3$ to first signal processing circuit $26_3$, photodetector $PD_4$ to first signal processing circuit $264_2$, and photodetector $PD_5$ to first signal processing circuit $26_5$. When all the frame sync detection signals $FS_1$ to $FS_5$ are input from the first signal processing circuits $26_1$ to $26_5$, the general read/write command is supplied to the P/S converter 30.

Upon reception of the general read/write command via the read controller 34, the write controllers $31_1$ to $31_5$ write one block after another the data $DATA_1$ to $DATA_5$ output from the first signal processing circuits $26_1$ to $26_5$, into the first areas of the memories $32_1$ to $32_5$, and writes the A-time data $AT_1$ to $AT_5$ corresponding to the data $DATA_1$ to $DATA_5$ and the pairs of start addresses $A_{1S}$ to $A_{5S}$ and end addresses $A_{1e}$ to $A_{5e}$ in the memories $32_1$ to $32_5$, into the first areas of the memories $33_1$ to $33_5$ (refer to FIG. 3). In the example shown in FIG. 4, in the first areas of the memories $33_1$ to $3_{3\ 5}$, the A-time data is written from the frames of 23:40:60, 23:41:15, 23:41:45, 23:42:00, and 23:42:30 (refer to FIG. 5).

The read controller 34 received the general read/write command checks whether there is no omission of record data read with each read system, by referring to the first areas of the memories $33_1$ to $33_5$ used at the present read cycle to confirm that the A-time one frame before the start A-time data in the first area of the memory $33_5$ is contained in the first area of the memory $33_4$, that the A-time one frame before the start A-time data in the first area of the memory $33_4$ is contained in the first area of the memory $33_3$, that the A-time one frame before the start A-time data in the first area of the memory $33_3$ is contained in the first area of the memory $33_2$, and that the A-time one frame before the start A-time data in the first area of the memory $33_2$ is contained in the first area of the memory $33_1$.

After the read operation by the optical pickup 2 is performed approximately I=two rotations (in actual, slightly more than two rotations) and the optical pickup 2 reaches a position IV shown in FIG. 4, the contents of the first areas of the memories $33_1$ to $33_5$ become as shown in FIG. 5 and there is no omission of record data read with the read systems. Therefore, the read controller 34 supplies the intercept command to the write controllers $31_1$ to $31_5$ to intercept the write operation, and supplies the track jump command to the system controller 50. With reference to the A-time data and the start and end addresses stored in the first areas among the memories $33_1$ to $33_5$ where data were written at the present read cycle, the read controller 34 controls to read record data in the order of A-time starting from the oldest A-time, relative to the data stored in the first areas among the memories $33_1$ to $33_5$ where data $DATA_1$ to $DATA_5$ were written at the present read cycle, and outputs the read data to the second signal processing circuit 40. In this example, the data from the frame 23:40:60 to the frame 23:42:59 is output. Since the read start point designated by the host computer has the A-time at the frame of 23:41:00, the data is output starting from the frame immediately before the read start point.

The second signal processing circuit 40 receives the data serially output from the P/S converter 30, descrambles the data in the unit of one block, and thereafter demodulates Lch and Rch data in conformity with the CD-DA specification through error detection/correction based on CIRC codes (error detection/correction with P parities, deinterleaveing, error detection/correction with Q parities). The second signal processing circuit 40 then demodulates the CD-ROM data from the Lch and Rch data by performing sync detection, descrambling, header detection, and error detection/correction with EDC and ECC codes in accordance with the CD-ROM specification, and thereafter outputs the CD-ROM data to an external host computer.

The write controllers $31_1$ to $31_5$ received the intercept command intercepts the read operation of the memories $32_1$ to $32_5$ and $33_1$ to $33_5$. The system controller 50 received the track jump command supplies the servo circuit 23 with the track jump command indicating a track jump by J=7 tracks in the forward direction to thereby jump the optical pickup 2 from the position IV to a position V shown in FIG. 4. After the light beams $3_1$ to $3_5$ are focussed in the track-on state on the tracks (x+8), (x+10), (x+12), (x+14), and (x+16), reading record data resumes. When all the frame sync detection signals $FS_1$ to $FS_5$ of H level are output from the first signal processing circuits $26_1$ to $26_5$, the track jump completion notice is read and supplied to the controller 34.

The controller 34 received the track jump completion notice supplies the resume command to the write controllers $31_1$ to $31_5$, and the write controllers $31_1$ to $31_5$ received the resume command write the data $DATA_1$ to $DATA_5$ output from the first signal processing circuits $26_1$ to $26_5$ after the track jump, this time into the second areas of the memories $32_1$ to $32_5$, and writes the A-time data $AT_1$ to $AT_5$ corresponding to the data $DATA_1$ to $DATA_5$ and the pairs of start addresses $a_{1S}$ to $a_{5S}$, and end addresses $a_{1e}$ to $a_{5e}$ in the memories $32_1$ to $32_5$, into the second areas of the memories $33_1$ to $33_5$ (refer to FIG. 3). In the example shown in FIG. 4, in the second areas of the memories $33_1$ to $33_5$, the A-time data is written from the frames of 23:42:48, 23:43:03, 23:43:33, 23:43:63, and 23:44:18 (refer to FIG. 5).

After the read controller 34 supplies the resume command, the read controller 34 checks whether there is no omission of record data read with each read system of the h=5 read light beams, by referring to the second areas of the memories $33_1$ to $33_5$ used at the present read cycle to confirm that the A-time one frame before the start A-time data in the second area of the memory $33_5$ is contained in the second area of the memory $33_4$, that the A-time one frame before the start A-time data in the second area of the memory $33_4$ is contained in the second area of the memory $33_3$, that the A-time one frame before the start A-time data in the second area of the memory $33_3$ is contained in the second area of the memory $33_2$, and that the A-time one frame before the start A-time data in the second area of the memory $33_2$ is contained in the second area of the memory $33_1$.

After the read operation by the optical pickup 2 is performed approximately I=two rotations (in actual, slightly more than two rotations) and the optical pickup 2 reaches a position VI shown in FIG. 4, the contents of the second areas of the memories $33_1$ to $33_5$ become as shown in FIG. 5 and there is no omission of record data read with the read systems Therefore, the read controller 34 supplies the intercept command to the write controllers $31_1$, to $31_5$ to intercept the write operation, and supplies the track jump command to the system controller 50. With reference to the A-time data and the start and end addresses stored in the second areas among the memories $33_1$ to $33_5$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$ to $32_5$ where data $DATA_1$ to $DATA_5$ were written at the present read cycle, and outputs the read data to the second signal processing circuit 40. In this example, the data from the frame 23:42:60 to the frame 23:44:47 is output.

The write controllers $31_1$ to $31_5$ received the intercept command intercepts the read operation of the memories $32_1$ to $32_5$ and $33_1$ to $33_5$. The system controller 50 received the track jump command controls to jump the optical pickup 2 from the position VI to a position VII shown in FIG. 4. After the light beams $3_1$ to $3_5$ are focussed in the track-on state on the tracks (x+17), (x+19), (x+21), (x+23), and (x+25), reading record data resumes. When all the frame sync detection signals $FS_1$ to $FS_5$ of H level are output from the first signal processing circuits $26_1$ to $26_5$, the track jump completion notice is read and supplied to the controller 34.

The controller 34 received the track jump completion notice via the read controller 34 controls to write the data $DATA_1$ to $DATA_5$ output from the first signal processing circuits $26_1$ to $26_5$ after the track jump, this time into the first areas of the memories $32_1$ to $32_5$, and writes the A-time data $AT_1$ to $AT_5$ corresponding to the data $DATA_1$ to $DATA_5$ and the pairs of start addresses $A_1$ to $A_5$s and end addresses $A_{1e}$ to $A_{5e}$ in the memories $32_1$ to $32_5$, into the first areas of the memories $33_1$ to $33_5$. When all A-time data stored in the first areas of the memories $33_1$ to $33_5$ become continuous without omission, the read controller 34 controls to read and output record data in the A-time order starting from the A-time next to the A-time corresponding to the one block data lastly output to the second signal processing circuit 40 at the preceding read cycle, relative to the first areas of the memories $32_1$ to $32_5$. Thereafter, similar operations are repeated to read at high speed desired record data from CD-ROM 1 by preventing the record data from being duplicated and omitted.

Figure 20A:
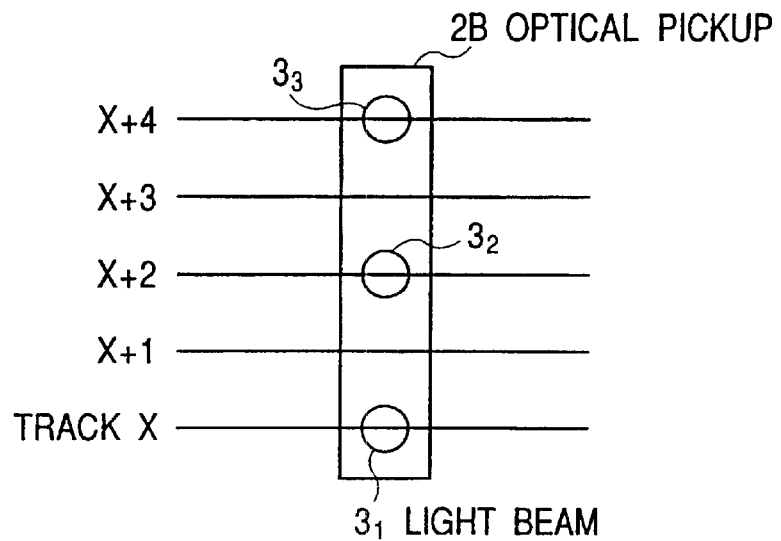
Figure 20B:
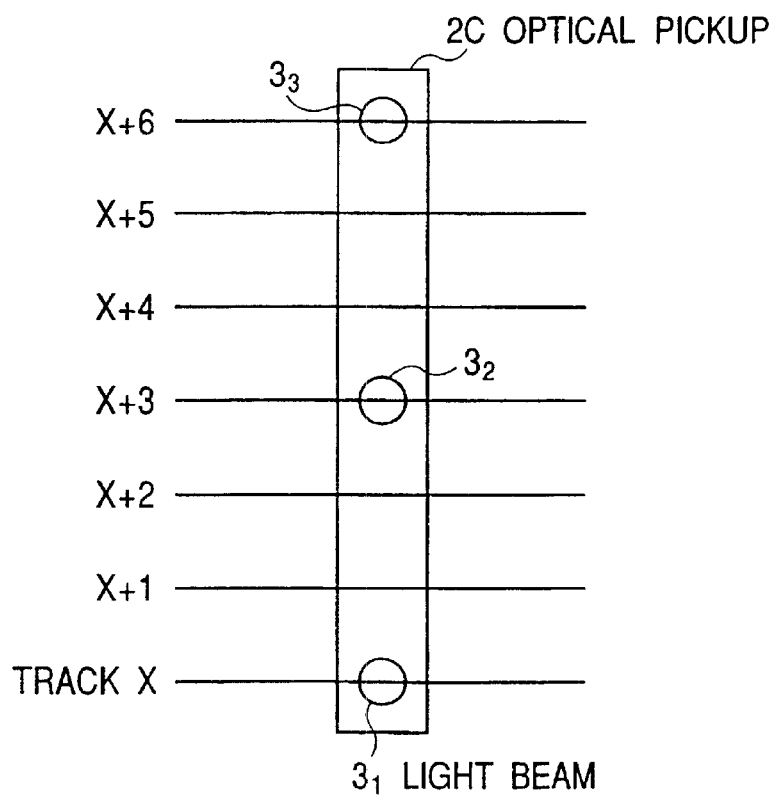

Reading the tracks (x−1) to (x+17) shown in FIG. 4 requires a continuous read of CD-ROM by about two rotations and one track jump and can be executed at much more higher speed than the case illustrated in FIG. 20.

Figure 6:
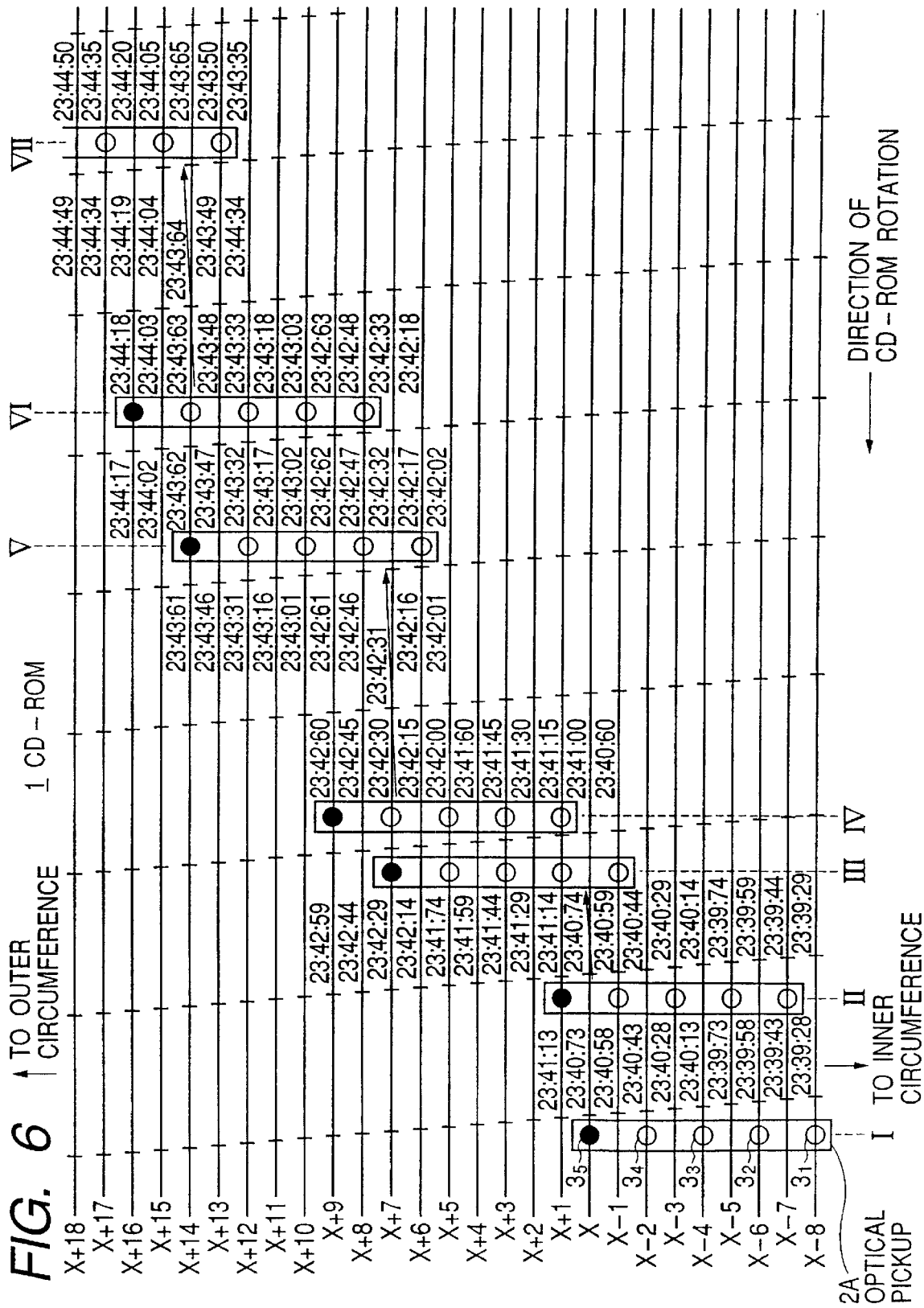
FIG. 6 is a diagram illustrating an example of a data read operation of the CD-ROM read apparatus shown in FIG. 1.
Figure 7:
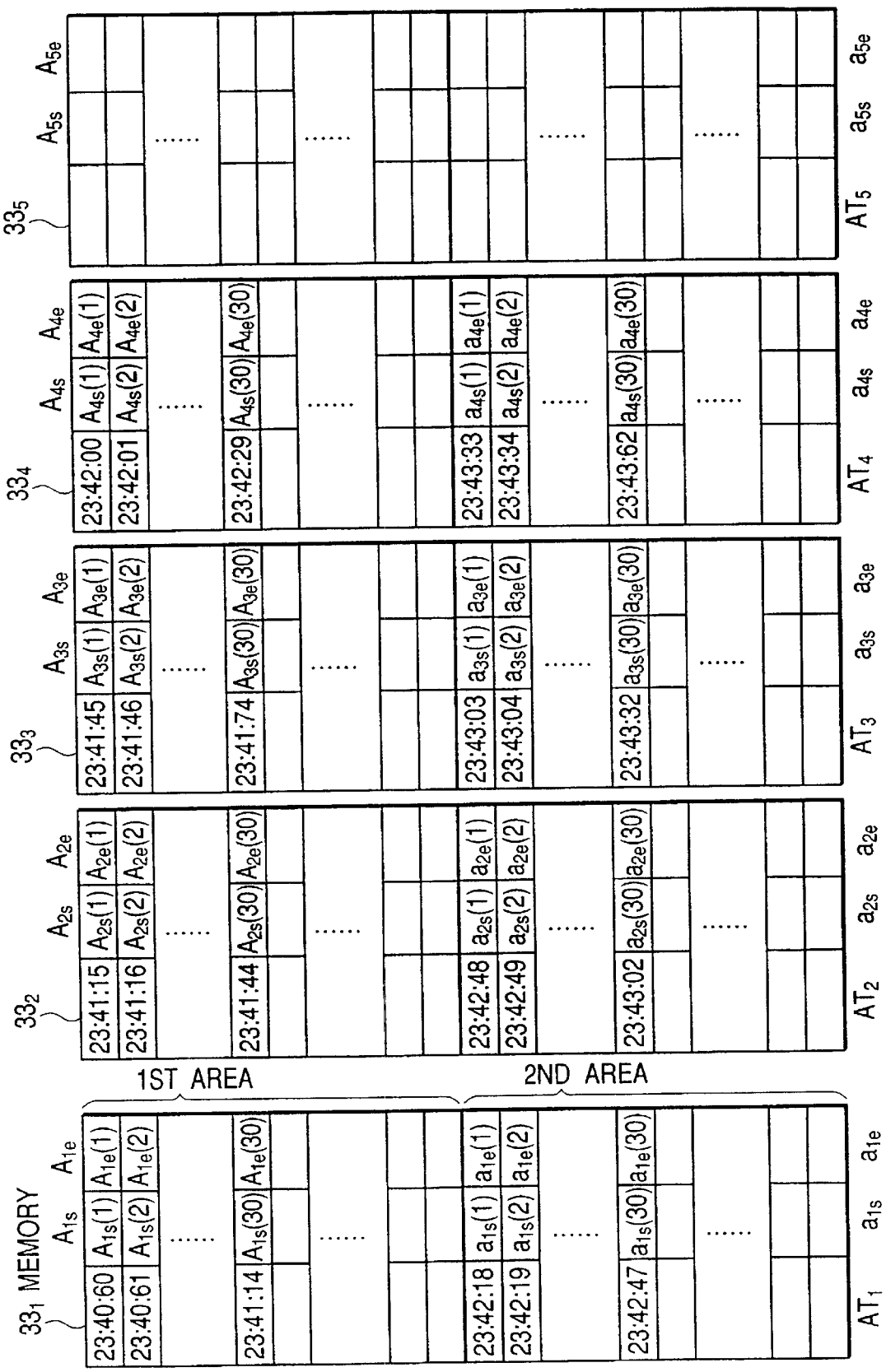
FIG. 7 is a diagram illustrating an example of the contents of the memory shown in FIG. 2.

(3) First Specific Read/write Operation (Read Unable by the Light Beam System $3_5$, Refer to FIGS. 6 and 7)

If the judgement of a presence/absence of a record data unreadable system during one relative rotation of the optical pickup 2 from a position I shown in FIG. 6 relative to CD-ROM 1, shows that there is one record data unreadable system of the light beam $3_5$ at the outermost circumference, M=4 light beams $3_1$ to $3_4$ are allocated as the read systems of h light beams, where M is the maximum number of adjacent light beam systems usable, which is "4" or a combination of light beams $3_1$ to $3_4$ and M≧2. The continuous read rotation number I is set as I=(c+1)=2, and the read track jump number J is set to J={(c+1) (M−1)−1}=5.

In accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=4 read light beams is focussed in the track-on state on the track (x−1) one track inner than the track x containing the read start point of the A-time.

If the optical pickup 2 is at a position II shown in FIG. 6 after the h read light beam systems are allocated and the continuous read number I and read track jump number J are set, the optical pickup 2 is jumped from the position II by six tracks in the forward direction so that the light beams $3_1$ to $3_4$ are focussed in the track-on state on the tracks (x−1), (x+1), (x+3), and (x+5). Then, reading the record data on the tracks (x−1), (x+1), (x+3), and (x+5) at the same time starts, by using four systems including the photodetector $PD_1$ to first signal processing circuit $26_1$, photodetector $PD_2$ to first signal processing circuit $26_2$, photodetector $PD_3$ to first signal processing circuit $26_3$, and photodetector $PD_4$ to first signal processing circuit $26_4$. When all the frame sync detection signals $FS_1$ to $FS_4$ are input from the first signal processing circuits $26_1$ to $26_4$, the specific read/write command including the read system information "1, 2, 3, 4" is supplied to the P/S converter 30.

Upon reception of the specific read/write command via the read controller 34, only the write controllers $31_1$ to $31_4$ indicated by the read system information "1, 2, 3, 4" write one block after another the data $DATA_1$ to $DATA_4$ output from the first signal processing circuits $26_1$ to $26_4$, into the first areas of the memories $32_1$ to $32_4$, and writes the A-time data $AT_1$ to $AT_4$ corresponding to the data $DATA_1$ to $DATA_4$ and the pairs of start addresses $A_{1S}$ to $A_{4S}$ and end addresses $A_{1e}$ to $A_{4e}$ in the memories $32_1$ to $32_4$, into the first areas of the memories $33_1$ to $33_4$. In the example shown in FIG. 6, in the first areas of the memories $33_1$ to $33_4$, the A-time data is written from the frames of 23:40:60, 23:41:15, 23:41:45, and 23:42:00 (refer to FIG. 7).

The read controller 34 received the specific read/write command checks whether there is no omission of record data read with each read system, by referring to the first areas of the memories $33_1$ to $33_4$ indicated by the read system information "1, 2, 3, 4" and used at the present read cycle to confirm that the A-time one frame before the start A-time data in the first area of the memory $33_4$ is contained in the first area of the memory $33_3$, that the A-time one frame before the start A-time data in the first area of the memory $33_3$ is contained in the first area of the memory $33_2$, and that the A-time one frame before the start A-time data in the first area of the memory $33_2$ is contained in the first area of the memory $33_1$.

After the read operation by the optical pickup 2 is performed approximately I=two rotations (in actual, slightly more than two rotations) and the optical pickup 2 reaches a position IV shown in FIG. 6, the contents of the first areas of the memories $33_1$ to $33_4$ become as shown in FIG. 7 and there is no omission of record data read with the read systems. Therefore, the read controller 34 supplies the intercept command to the write controllers $31_1$ to $31_4$ to intercept the write operation, and supplies the track jump command to the system controller 50. With reference to the A-time data and the start and end addresses stored in the first areas among the memories $33_1$ to $33_4$ where data were written at the present read cycle, the read controller 34 controls to read record data in the order of A-time starting from the oldest A-time, relative to the data stored in the first areas among the memories $33_1$ to $33_4$ where data $DATA_1$ to $DATA_4$ were written at the present read cycle, and outputs the read data to the second signal processing circuit 40. In this example, the data from the frame 23:40:60 to the frame 23:42:29 is output.

The write controllers $3_1$ to 314 received the intercept command intercepts the read operation of the memories $32_1$ to $32_4$ and $33_1$ to $33_4$. The system controller 50 received the track jump command supplies the servo circuit 23 with the track jump command indicating a track jump by J=5 tracks in the forward direction to thereby jump the optical pickup 2 from the position IV to a position V shown in FIG. 6. After the light beams $3_5$ to $3_4$ are focussed in the track-on state on the tracks (x+6), (x+8), (x+10), and (x+12), reading record data resumes. When all the frame sync detection signals $FS_1$ to $FS_5$ of H level are output from the first signal processing circuits $26_1$ to $26_4$, the track jump completion notice is read and supplied to the controller 34.

The controller 34 received the track jump completion notice supplies the resume command to the write controllers $31_1$ to $31_4$, and the write controllers $31_1$ to $31_4$ received the resume command write the data $DATA_1$ to $DATA_4$ output from the first signal processing circuits $26_1$ to $26_4$ after the track jump, this time into the second areas of the memories $32_1$ to $32_4$, and writes the A-time data $AT_1$ to $AT_4$ corresponding to the data $DATA_1$ to $DATA_4$ and the pairs of start addresses $a_{1s}$ to $a_{4s}$ and end addresses $a_{1e}$ to $a_{4e}$ in the memories $32_1$ to $32_4$, into the second areas of the memories $33_1$ to $33_4$. In the example shown in FIG. 6, in the second areas of the memories $33_1$ to $33_4$, the A-time data is written from the frames of 23:42:18, 23:42:48, 23:43:03, and 23:43:33(refer to FIG. 7).

After the read controller 34 supplies the resume command, the read controller 34 checks whether there is no omission of record data read with each read system, by referring to the second areas of the memories $33_1$ to $33_4$ used at the present read cycle to confirm that the A-time one frame before the start A-time data in the second area of the memory $33_4$ is contained in the second area of the memory $33_3$, that the A-time one frame before the start A-time data in the second area of the memory $33_3$ is contained in the second area of the memory $33_2$, and that the A-time one frame before the start A-time data in the second area of the memory $33_2$ is contained in the second area of the memory $33_1$. After the read operation by the optical pickup 2 is performed approximately I=two rotations (in actual, slightly more than two rotations) and the optical pickup 2 reaches a position VI shown in FIG. 6, the contents of the second areas of the memories $33_1$ to $33_4$ become as shown in FIG. 7 and there is no omission of record data read with the read systems "1, 2, 3, 4". Therefore, the read controller 34 supplies the intercept command to the write controllers $31_1$ to $31_4$ to intercept the write operation, and supplies the track jump command to the system controller 50. With reference to the A-time data and the start and end addresses stored in the second areas among the memories $33_1$ to $33_4$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$ to $32_4$ where data $DATA_1$ to $DATA_4$ were written at the present read cycle, and outputs the read data to the second signal processing circuit 40. In this example, the data from the frame 23:42:30 to the frame 23:43:62 is output.

The write controllers $31_1$ to $31_4$ received the intercept command intercepts the read operation. The system controller 50 received the track jump command controls to jump the optical pickup 2 from the position VI to a position VII shown in FIG. 6. After the light beams $3_1$ to $3_4$ are focussed in the track-on state on the tracks (x+13), (x+15), (x+17), and (x+19), reading record data resumes. When all the frame sync detection signals $FS_1$ to $FS_4$ of H level are output from the first signal processing circuits $26_1$ to $26_4$, the track jump completion notice is read and supplied to the controller 34. Thereafter, similar operations are repeated to read at high speed desired record data from CD-ROM 1 by using the four beams $3_1$ to $3_4$ and by preventing the record data from being duplicated and omitted.

Figure 8:
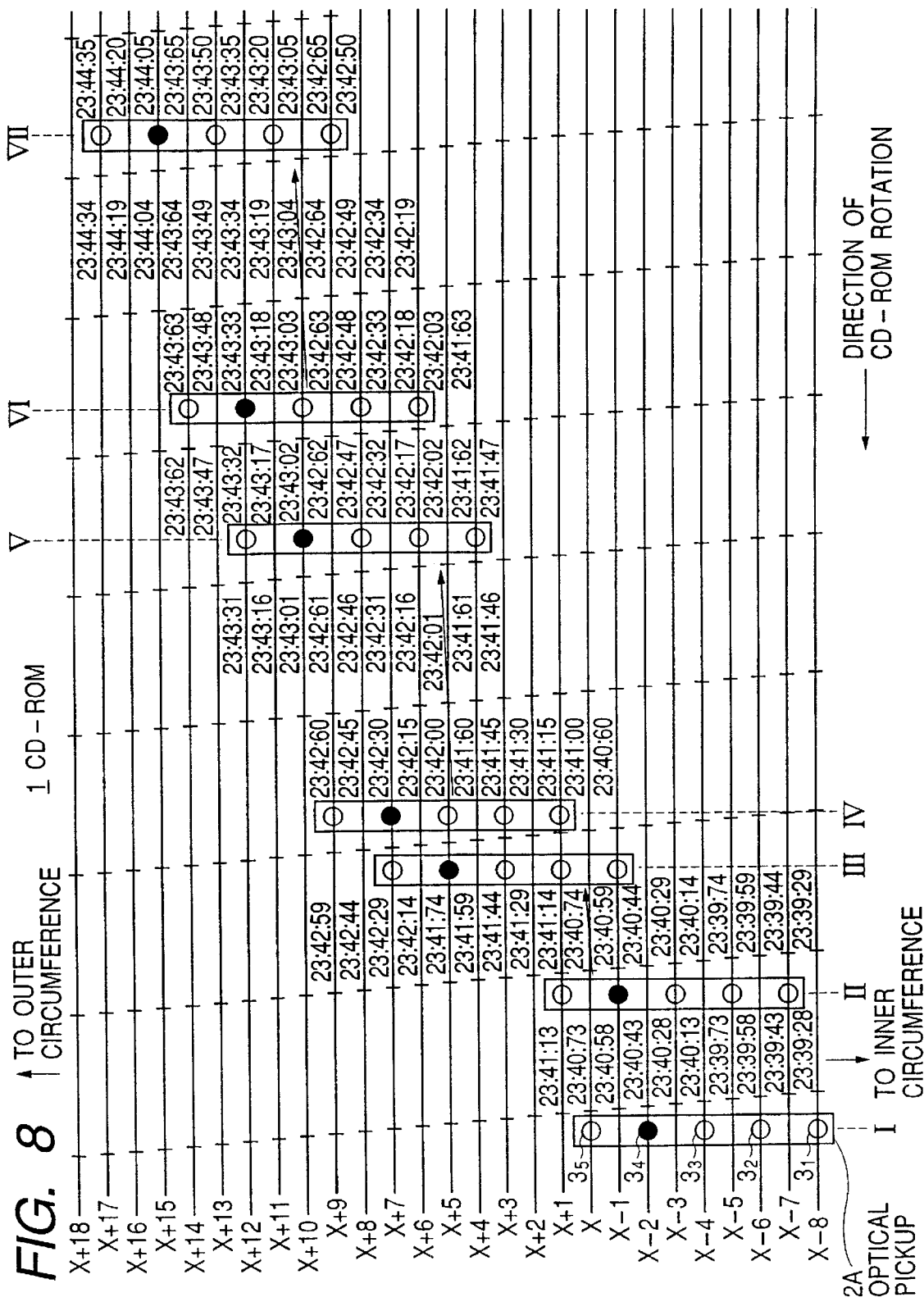
FIG. 8 is a diagram illustrating an example of a data read operation of the CD-ROM read apparatus shown in FIG. 1.
Figure 9:
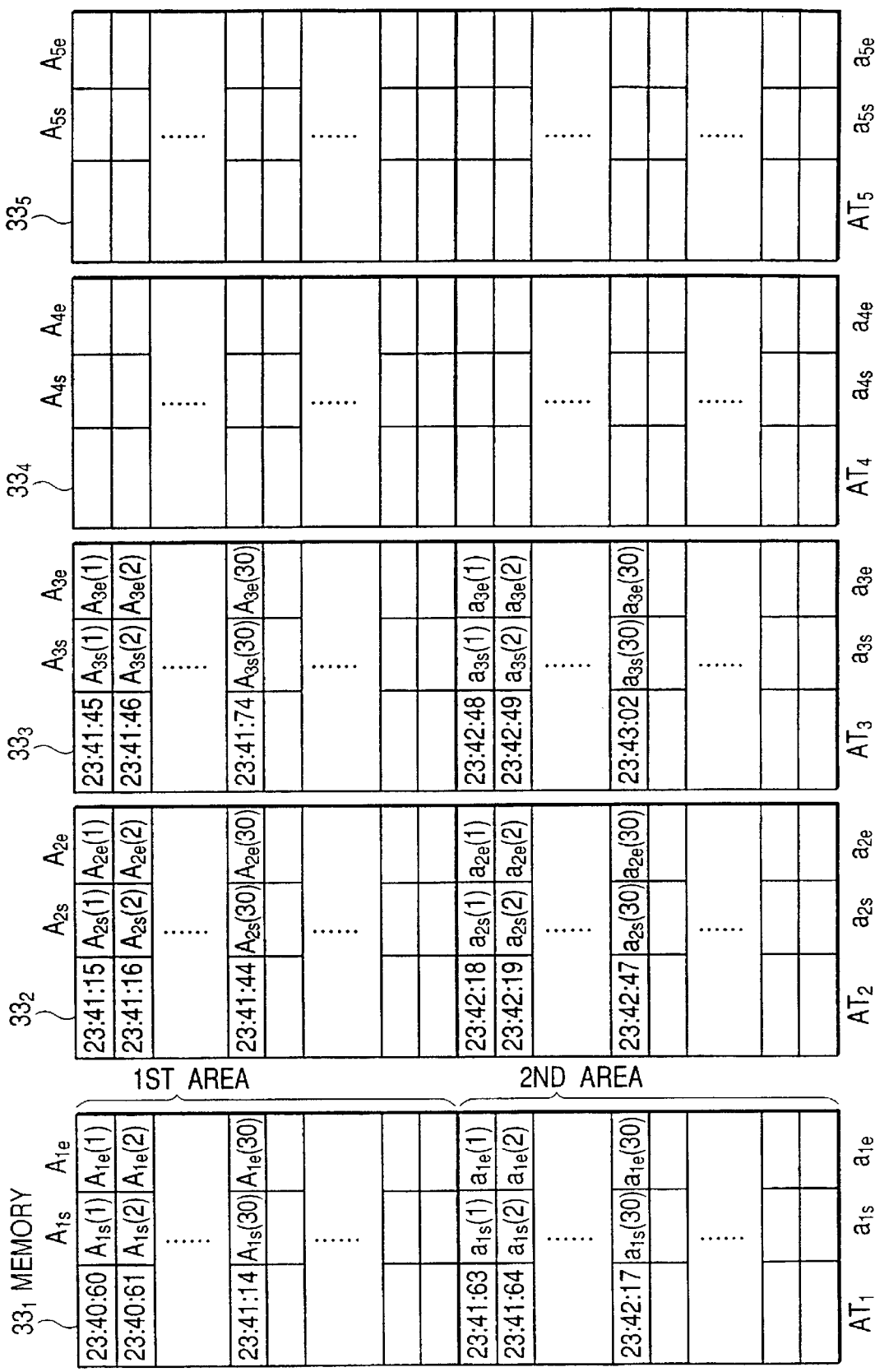
FIG. 9 is a diagram illustrating an example of the contents of the memory shown in FIG. 2.

(4) Second Specific Read/write Operation (Read Unable by the Light Beam System $3_4$, Refer to FIGS. 8 and 9)

If the judgement of a presence/absence of a record data unreadable system during one relative rotation of the optical pickup 2 from a position I shown in FIG. 8 relative to CD-ROM 1, shows that there is one record data unreadable system of the light beam 34, M=3 light beams $3_1$ to $3_3$ are allocated as the read systems of h light beams, where M is the maximum number of adjacent light beam systems usable, which is "3" or a combination of light beams $3_1$ to $3_3$ and M≧2. The continuous read rotation number I is set as I=(c+1)=2, and the read track jump number J is set to J={(c+1)·(M-1)-1}=3. In accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=3 read light beams is focussed in the track-on state on the track (x-1) one track inner than the track x containing the read start point of the A-time.

If the optical pickup 2 is at a position II shown in FIG. 8 after the h read light beam systems are allocated and the continuous read number I and read track jump number J are set, the optical pickup 2 is jumped from the position II by six tracks in the forward direction so that the light beams $3_1$ to $3_4$ are focussed in the track-on state on the tracks (x-1), (x+1), and (x+3). Then, reading the record data on the tracks (x-1), (x+1) and (x+3) at the same time starts, by using three systems including the photodetector $PD_1$ to first signal processing circuit $26_1$, photodetector $PD_2$ to first signal processing circuit $26_2$, and photodetector $PD_3$ to first signal processing circuit $26_3$. When all the frame sync detection signals $FS_1$ to $FS_3$ are input from the first signal processing circuits $26_1$ to $26_3$, the specific read/write command including the read system information "1, 2, 3" is supplied to the P/S converter 30.

Upon reception of the specific read/write command via the read controller 34, only the write controllers 311 to 313 indicated by the read system information "1, 2, 3" write one block after another the data $DATA_1$ to $DATA_3$ output from the first signal processing circuits $26_1$ to $26_3$, into the first areas of the memories $32_1$ to $32_3$, and writes the A-time data AT1 to $AT_3$ corresponding to the data $DATA_1$ to $DATA_3$ and the pairs of start addresses $A_{1s}$ to $A_{3s}$ and end addresses $A_{1e}$ to $A_{3e}$ in the memories $32_1$ to $33_3$, into the first areas of the memories $33_1$ to $33_3$. In the example shown in FIG. 8, in the first areas of the memories $33_1$ to $33_3$, the A-time data is written from the frames of 23:40:60, 23:41:15, and 23:41:45 (refer to FIG. 9).

The read controller 34 received the specific read/write command checks whether there is no omission of record data read with each read system, by referring to the first areas of the memories $33_1$ to $33_3$ indicated by the read system information "1, 2, 3" and used at the present read cycle to confirm that the A-time one frame before the start A-time data in the first area of the memory $33_3$ is contained in the first area of the memory $33_2$, and that the A-time one frame before the start A-time data in the first area of the memory $33_2$ is contained in the first area of the memory $33_1$.

After the read operation by the optical pickup 2 is performed approximately I=two rotations (in actual, slightly more than two rotations) and the optical pickup 2 reaches a position IV shown in FIG. 8, the contents of the first areas of the memories $33_1$ to $33_3$ become as shown in FIG. 9 and there is no omission of record data read with the read systems. Therefore, the read controller 34 supplies the intercept command to the write controllers $31_1$ to $31_3$ to intercept the write operation, and supplies the track jump command to the system controller 50. With reference to the A-time data and the start and end addresses stored in the first areas among the memories $33_1$ to $33_3$ where data were written at the present read cycle, the read controller 34 controls to read record data in the order of A-time starting from the oldest A-time, relative to the data stored in the first areas among the memories $33_1$ to $33_3$ where data $DATA_1$ to $DATA_3$ were written at the present read cycle, and outputs the read data to the second signal processing circuit 40. In this example, the data from the frame 23:40:60 to the frame 23:41:74 is output.

The write controllers $31_1$ to $31_4$ received the intercept command intercepts the read operation, and the system controller 50 received the track jump command supplies the servo circuit 23 with the track jump command indicating a track jump by J=3 tracks in the forward direction to thereby jump the optical pickup 2 from the position IV to a position V shown in FIG. 8. After the light beams $3_1$ to $3_3$ are focussed in the track-on state on the tracks (x+4), (x+6), and (x+8), reading record data resumes. When all the frame sync detection signals $FS_1$ to $FS_3$ of H level are output from the first signal processing circuits $26_1$ to $26_3$, the track jump completion notice is read and supplied to the controller 34.

The controller 34 received the track jump completion notice supplies the resume command to the write controllers $31_1$ to $31_3$, and the write controllers $31_1$ to $31_3$ received the resume command write the data $DATA_1$ to $DATA_3$ output from the first signal processing circuits $26_1$ to $26_3$ after the track jump, this time into the second areas of the memories $32_1$ to $32_3$, and writes the A-time data $AT_1$ to $AT_3$ corresponding to the data $DATA_1$ to $DATA_3$ and the pairs of start addresses $a_{1s}$ to $a_{3s}$ and end addresses $a_{1e}$ to $a_{3e}$ in the memories $32_1$ to $32_3$, into the second areas of the memories $33_1$ to $33_3$. In the example shown in FIG. 8, in the second areas of the memories $33_1$ to $33_3$, the A-time data is written from the frames of 23:41:63, 23:42:18, and 23:42:48 (refer to FIG. 9).

After the read controller 34 supplies the resume command, the read controller 34 checks whether there is no omission of record data read with each read system, by referring to the second areas of the memories $33_1$ to $33_3$ used at the present read cycle to confirm that the A-time one frame before the start A-time data in the second area of the memory $33_3$ is contained in the second area of the memory $33_2$, and that the A-time one frame before the start A-time data in the second area of the memory $33_2$ is contained in the second area of the memory $33_1$.

After the read operation by the optical pickup 2 is performed approximately I=two rotations (in actual, slightly more than two rotations) and the optical pickup 2 reaches a position VI shown in FIG. 8, the contents of the second areas of the memories $33_1$ to $33_3$ become as shown in FIG. 9 and there is no omission of record data read with the read systems "1, 2, 3". Therefore, the read controller 34 supplies the intercept command to the write controllers $31_1$ to $31_3$ to intercept the write operation, and supplies the track jump command to the system controller 50. With reference to the A-time data and the start and end addresses stored in the second areas among the memories $33_1$ to $33_3$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$ to $32_3$ where data $DATA_1$ to $DATA_3$ were written at the present read cycle, and outputs the read data to the second signal processing circuit 40. In this example, the data from the frame 23:42:00 to the frame 23:43:02 is output.

The write controllers $31_1$ to $31_3$ received the intercept command intercepts the read operation. The system controller 50 received the track jump command controls to jump the optical pickup 2 from the position VI to a position VII shown in FIG. 8. After the light beams $3_1$ to $3_3$ are focussed in the track-on state on the tracks (x+9), (3+11), and (x+13), reading record data resumes. Thereafter, similar operations are repeated to read at high speed desired record data from CD-ROM 1 by using the four beams $3_1$ to $3_3$ and by preventing the record data from being duplicated and omitted.

Figure 10:
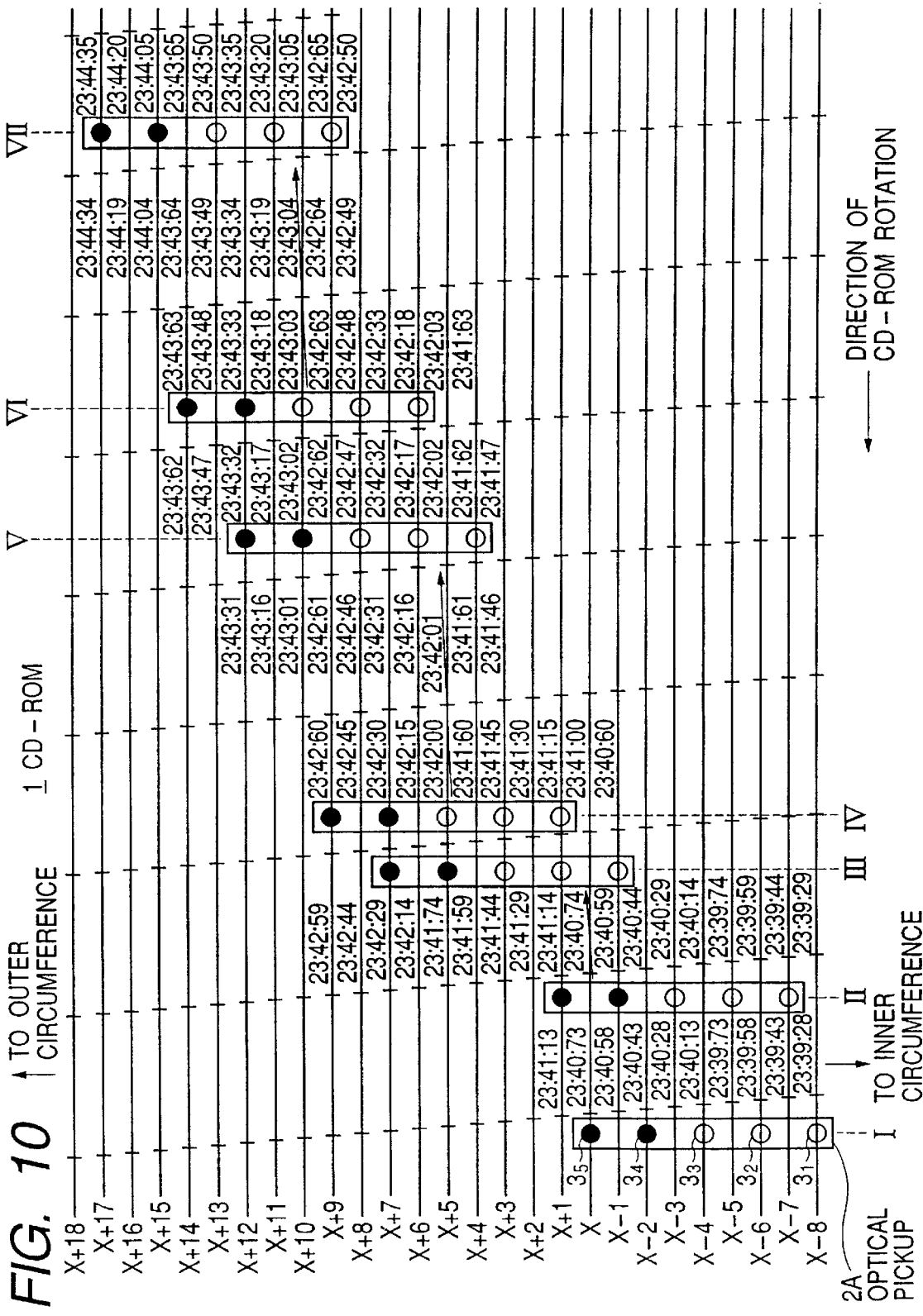
FIG. 10 is a diagram illustrating an example of a data read operation of the CD-ROM read apparatus shown in FIG. 1.

(5) Third Specific Read/write Operation (Read Unable by the Light Beam Systems $3_4$ and $3_1$, Refer to FIGS. 10 and 9)

If the judgement of a presence/absence of a record data unreadable system during one relative rotation of the optical pickup 2 from a position I shown in FIG. 10 relative to CD-ROM 1, shows that there are two record data unreadable systems of the light beams $3_4$ and $3_5$, M=3 light beams $3_1$ to $3_3$ are allocated as the read systems of h light beams, where M is the maximum number of adjacent light beam systems usable, which is "3" or a combination of light beams $3_1$ to $3_3$ and M≧2. The continuous read rotation number I is set as I=(c+1)=2, and the read track jump number J is set to J={(c+1)·(M−1)−1=3. In accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=3 read light beams is focussed in the track-on state on the track (x−1) one track inner than the track x containing the read start point of the A-time.

If the optical pickup 2 is at a position II shown in FIG. 8 after the h read light beam systems are allocated and the continuous read number I and read track jump number J are set, the optical pickup 2 is jumped from the position II by six tracks in the forward direction so that the light beams $3_1$ to $3_3$ are focussed in the track-on state on the tracks (x−1), (x+1), and (x+3). Then, reading the record data on the tracks (x−1), (x+1) and (x+3) at the same time starts, by using three systems including the photodetector $PD_1$ to first signal processing circuit $26_1$, photodetector $PD_2$ to first signal processing circuit $26_2$, and photodetector $PD_3$ to first signal processing circuit $26_3$. When all the frame sync detection signals $FS_1$ to $FS_3$ are input from the first signal processing circuits $26_1$ to $26_3$, the specific read/write command including the read system information "1, 2, 3" is supplied to the P/S converter 30.

Thereafter, quite similar to the case shown in FIG. 8, an operation of reading record data from CD-ROM 1 by approximately two rotations, jumping the optical pickup by the track jump number J=3, again reading record data from CD-ROM 1 by approximately two rotations, and jumping the optical pickup by the track jump number J=3 is repeated (refer to III to VII in FIG. 10) to read record data at high speed in the record order by preventing the record data from being duplicated and omitted.

Figure 11:
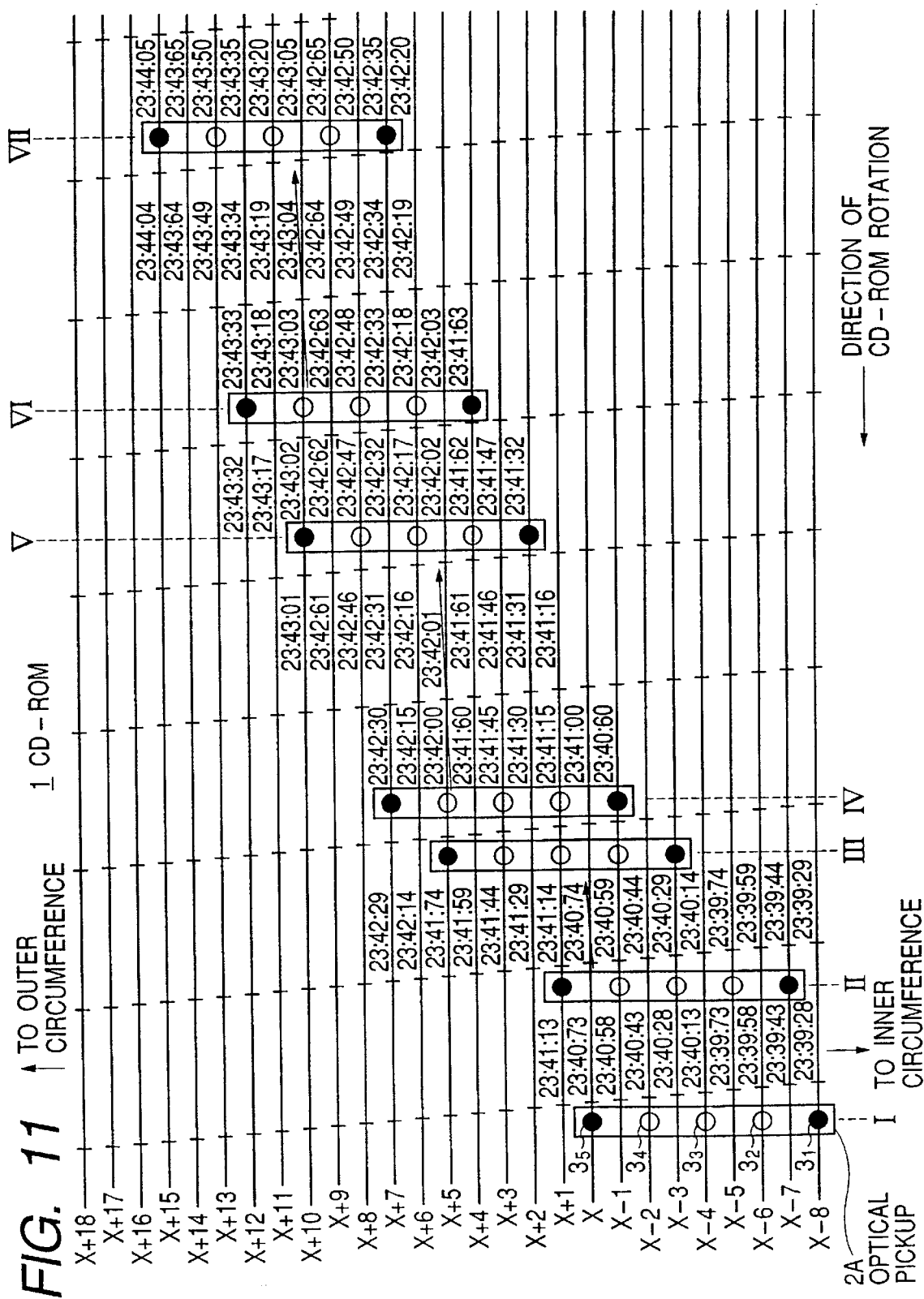
FIG. 11 is a diagram illustrating an example of a data read operation of the CD-ROM read apparatus shown in FIG. 1.

(6) Fourth Specific Read/write Operation (Read Unable by the Light Beam Systems $3_1$ and $3_5$, Refer to FIG. 11)

If the judgement of a presence/absence of a record data unreadable system during one relative rotation of the optical pickup 2 from a position I shown in FIG. 11 relative to CD-ROM 1, shows that there are two record data unreadable systems of the light beams $3_1$ and $3_1$, M=3 light beams $3_2$ to $3_4$ are allocated as the read systems of h light beams, where M is the maximum number of adjacent light beam systems usable, which is "3" or a combination of light beams $3_2$ to $3_4$ and M≧2. The continuous read rotation number I is set as I=(c+1)=2, and the read track jump number J is set to J={(c+1)·(M−1)−1}=3. In accordance with the A-time data representative of the latest A-time data $AT_3$ input from the first signal processing circuit $26_3$ and the read start point A-time designated by the host computer, the track jump direction and number are determined so that the light beam $3_2$ at the innermost circumference among the h=3 read light beams is focussed in the track-on state on the track (x−1) one track inner than the track x containing the read start point of the A-time.

If the optical pickup 2 is at a position II shown in FIG. 11 after the h=3 read light beam systems are allocated and the continuous read number I and read track jump number J are set, the optical pickup 2 is jumped from the position II shown in FIG. 11 by four tracks in the forward direction so that the light beams $3_2$ to $3_4$ are focussed in the track-on state on the tracks (x−1), (x+1), and (x+3). Then, reading the record data on the tracks (x+1), (x+1) and (x+3) at the same time starts, by using three systems including the photodetector $PD_2$ to first signal processing circuit $26_2$, photodetector $PD_3$ to first signal processing circuit $26_3$, and photodetector $PD_4$ to first signal processing circuit $26_4$. When all the frame sync detection signals $FS_2$ to $FS_4$ are input from the first signal processing circuits $26_2$ to $26_4$, the specific read/write command including the read system information "2, 3, 4" is supplied to the P/S converter 30.

Thereafter, nearly similar to the case shown in FIG. 8 (in the case shown in FIG. 11, the write controllers $31_2$ to $31_4$ control to write the data $DATA_2$ to $DATA_4$ and A-time data $AT_2$ to $AT_4$ output from the first signal processing circuit $26_2$ to $26_4$, into the memories $32_2$ to $32_4$ and $33_2$ to $33_4$, and with reference to the the A-time data and start and end addresses stored in the memories $3_{3\ 2}$ to $33_4$, the read controller 34 controls to read record data stored in the memories $33_2$ to $33_4$ in the order of At-time by preventing the record data from being duplicated and omitted), an operation of reading record data from CD-ROM 1 by approximately two rotations, jumping the optical pickup by the track jump number J=3, again reading record data from CD-ROM 1 by approximately two rotations, and jumping the optical pickup by the track jump number J=3 is repeated (refer to III to VII in FIG. 11) to sequentially read record data at high speed in the record order by preventing the record data from being duplicated and omitted.

Figure 12:
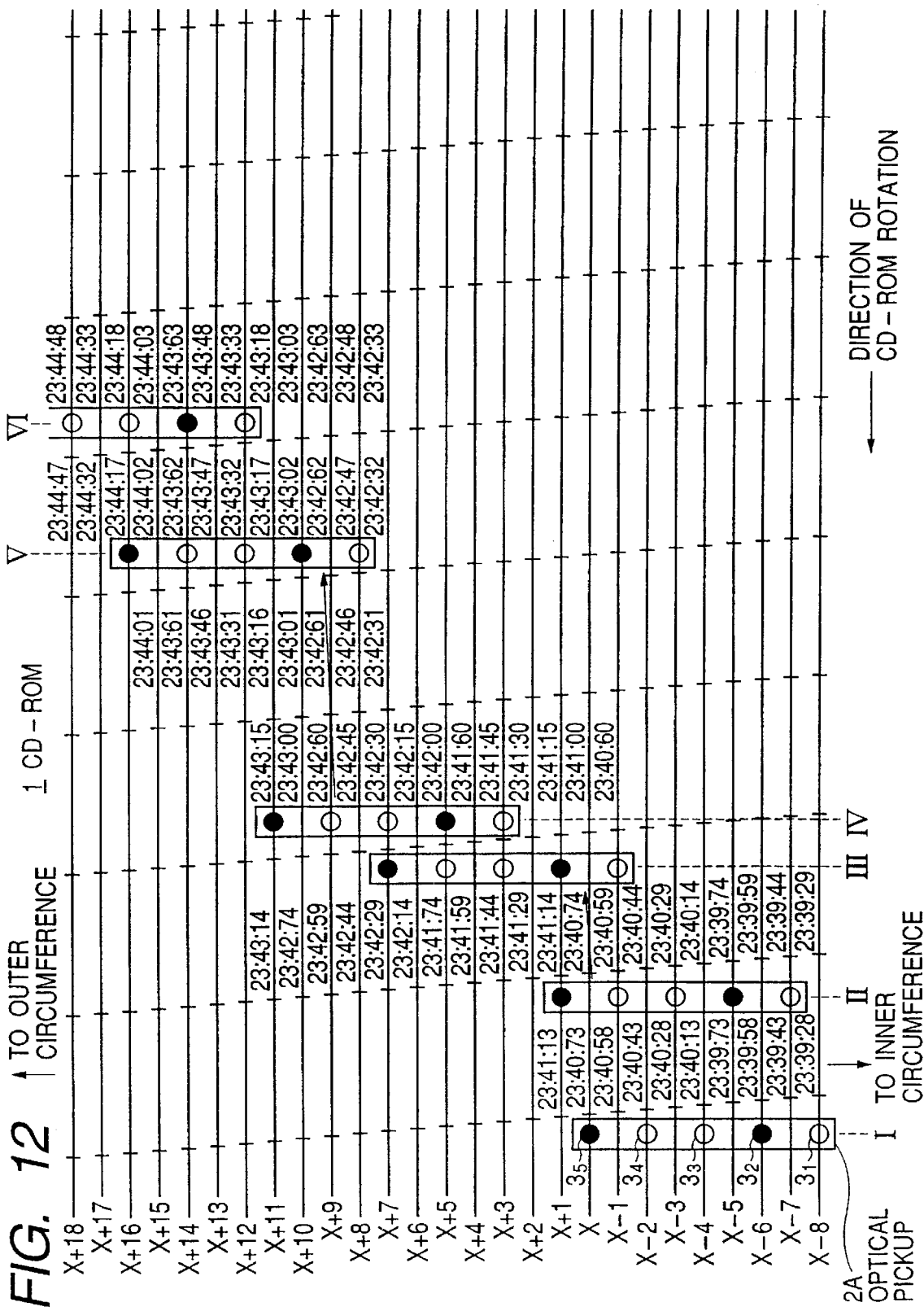
FIG. 12 is a diagram illustrating an example of a data read operation of the CD-ROM read apparatus shown in FIG. 1.
Figure 13:
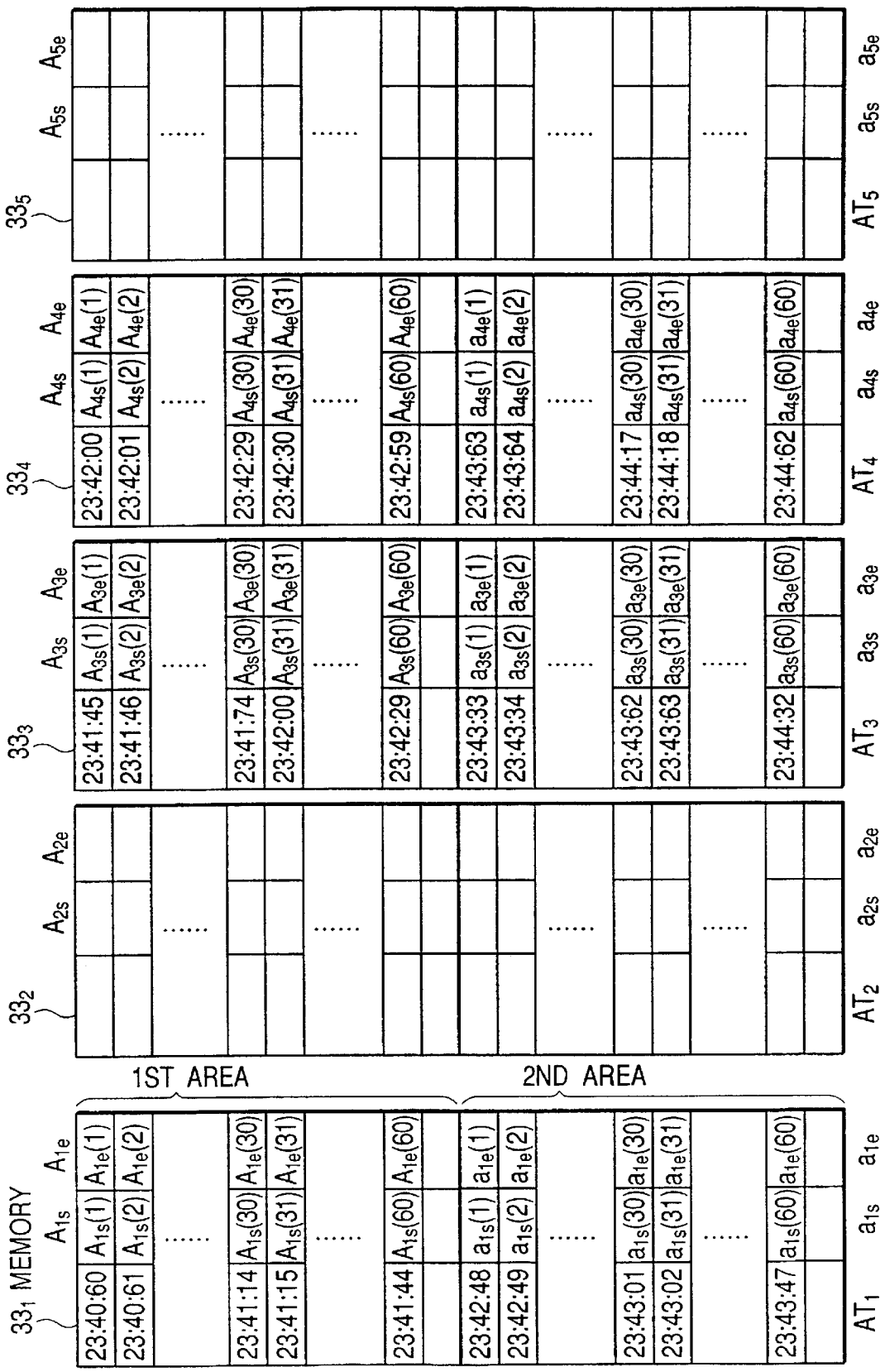
FIG. 13 is a diagram illustrating an example of the contents of the memory shown in FIG. 2.

(7) Fifth Specific Read/write Operation (Read Unable by the Light Beams $3_2$ and $3_5$, Refer to FIGS. 12 and 13)

If the judgement of a presence/absence of a record data unreadable system during one relative rotation of the optical pickup 2 from a position I shown in FIG. 12 relative to CD-ROM 1, shows that there are two record data unreadable systems of the light beams $3_2$ and $3_5$, then only two light beams $3_3$ and $3_4$ are adjacent each other among the remaining three light beams $3_1$, $3_3$, and $3_4$. In reading at high speed record data of CD-ROM 1 by repetitively performing continuous record data read by approximately two rotations and track jump, it is necessary to read record data only with adjacent light beams. High speed read is possible even for a combination of read light beams not completely adjacent each other, if continuous record data read of CD-ROM 1 by three or more rotations and track jump by predetermined tracks are repeated.

Specifically, continuously reading record data with data readable light beams during approximately {(R+1) (c+1)} rotations and track jump by (Q−1) track can be repeated if Q is 2 or larger and R is 0 or larger, where Q is the number of tracks representing a distance between the innermost light beam and outermost light beam among the record data readable light beam systems, and R is the maximum number of adjacent record data unreadable light beams between the innermost and outermost record data readable light beams.

In the example shown in FIGS. 12 and 13, of the record data readable light beam systems, the innermost light beam is the light beam $3_1$ and the outermost light beam is the light beam $3_4$ SO that Q=6. In the adjacent record data unreadable light beams between the light beams $3_1$ and $3_4$, the maximum number of adjacent record data unreadable light beams is "1" because there is only the light beam $3_2$. As the h read light beam systems, all the three record data readable light beam systems $3_1$, $3_3$, and $3_4$ are allocated. The continuous read rotation number I is set as I={(R+1) (c+1)}=4, and the read track jump number J is set to J=(Q−1)=5.

If the optical pickup 2 is at a position II shown in FIG. 12 after the h=3 read light beam systems are allocated and the continuous read number I=2 and read track jump number J=5 are set, the optical pickup 2 is jumped from the position II by six tracks in the forward direction so that the light beams $3_1$, $3_3$, and $3_4$ are focussed in the track-on state on the tracks (x−1), (x+3), and (x+5). Then, reading the record data on the tracks (x−1), (x+3), and (x+5) at the same time starts, by using three systems including the photodetector $PD_1$ to first signal processing circuit $26_1$, photodetector $PD_1$ to first signal processing circuit $26_3$, and photodetector $PD_4$ to first signal processing circuit $26_4$. When all the frame sync detection signals $FS_1$, $FS_3$, and $FS_4$ are input from the first signal processing circuits $26_1$, $26_3$, and $26_4$, the specific read/write command including the read system information "1, 3, 4" is supplied to the P/S converter 30.

Upon reception of the specific read/write command via the read controller 34, only the write controllers $31_1$, $31_3$, and $31_4$ indicated by the read system information "1, 3, 4" write one block after another the data $DATA_1$, $DATA_3$, and $DATA_4$ output from the first signal processing circuits $26_1$, $26_3$, and $26_4$, into the first areas of the memories $32_1$, $32_3$, and $32_4$, and writes the A-time data $AT_1$, $AT_3$, and $AT_4$ corresponding to the data $DATA_1$, $DATA_3$, and $DATA_4$ and the pairs of start addresses $A_{1s}$, $A_{3s}$, and $A_{4s}$ and end addresses $A_{1e}$, $A_{3e}$ and $A_{4e}$ in the memories $32_1$, $32_3$, and $32_4$, into the first areas of the memories $33_1$, $33_3$, and $33_4$. In the example shown in FIG. 12, in the first areas of the memories $33_1$, $33_3$, and $33_4$, the A-time data is written from the frames of 23:40:60, 23:41:15, and 23:42:00 (refer to FIG. 13).

The read controller 34 received the specific read/write command checks whether there is no omission of record data read with each read system, by referring to the first areas of the memories $33_1$, $33_3$, and $33_4$ indicated by the read system information "1, 3, 4" and used at the present read cycle to confirm that the A-time one frame before the start A-time data in the first area of the memory $33_4$ is contained in the first area of the memory $33_3$, and that the A-time one frame before the start A-time data in the first area of the memory $33_3$ is contained in the first area of the memory $33_1$.

After the read operation by the optical pickup 2 is performed approximately I=four rotations (in actual, slightly more than four rotations) and the optical pickup 2 reaches a position IV shown in FIG. 12, the contents of the first areas of the memories $33_1$, $33_3$, and $33_4$ become as shown in FIG. 13 and there is no omission of record data read with the read systems. Therefore, the read controller 34 supplies the intercept command to the write controllers $31_1$, $31_3$, and $31_4$ to intercept the write operation, and supplies the track jump command to the system controller 50. With reference to the A-time data and the start and end addresses stored in the first areas among the memories $33_1$, $33_3$, and $33_4$, the read controller 34 controls to read record data in the order of A-time starting from the oldest A-time, relative to the data stored in the first areas among the memories $33_1$, $33_3$, and $33_4$, and outputs the read data to the second signal processing circuit 40. In this example, the data from the frame 23:40:60 to the frame 23:42:50 is output.

The write controllers $31_1$, $31_3$, and $31_4$ received the intercept command intercepts the read operation, and the system controller 50 received the track jump command supplies the servo circuit 23 with the track jump command indicating a track jump by J=5 tracks in the forward direction to thereby jump the optical pickup 2 from the position IV to a position V shown in FIG. 12. After the light beams $3_1$, $3_3$ and $3_4$ are focussed in the track-on state on the tracks (x+8), (x+12), and (x+14), reading record data resumes. When all the frame sync detection signals $FS_1$, $FS_3$, and $FS_5$ of H level are output from the first signal processing circuits $26_1$, $26_3$, and $26_4$, the track jump completion notice is read and supplied to the controller 34.

The controller 34 received the track jump completion notice supplies the resume command to the write controllers $31_1$, $31_3$, and $31_4$, and the write controllers $31_1$, $31_3$, and $31_4$ received the resume command write the data $DATA_1$, $DATA_3$, and $DATA_4$ output from the first signal processing circuits $26_1$, $26_3$, and $26_4$ after the track jump, this time into the second areas of the memories $32_1$, $32_3$, and $32_4$, and writes the A-time data $AT_1$, $AT_3$, and $AT_4$ corresponding to the data $DATA_1$, $DATA_3$, and $DATA_4$ and the pairs of start addresses $a_{1s}$, $a_{3s}$, and $a_{4s}$ and end addresses $a_{1e}$, $a_{3e}$, and $a_{4e}$ in the memories $32_1$, $32_3$, and $32_4$, into the second areas of the memories $33_1$ $33_3$, and $33_4$. In the example shown in FIG. 12, in the second areas of the memories $33_1$, $33_3$, and $33_4$, the A-time data is written from the frames of 23:42:48, 23:43:33, and 23:43:63 (refer to FIG. 13).

After the read controller 34 supplies the resume command, the read controller 34 checks whether there is no omission of record data read with each read system, by referring to the second areas of the memories $33_1$, $33_3$, and $33_4$ used at the present read cycle to confirm that the A-time one frame before the start A-time data in the second area of the memory $33_4$ is contained in the second area of the memory $33_3$, and that the A-time one frame before the start A-time data in the second area of the memory $33_3$ is contained in the second area of the memory $33_1$.

After the read operation by the optical pickup 2 is performed approximately I=four rotations (in actual, slightly more than four rotations) and the optical pickup 2 reaches a position VI shown in FIG. 12, the contents of the second areas of the memories $33_1$, $33_3$, and $33_4$ become as shown in FIG. 13 and there is no omission of record data read with the read systems "1, 3, 4". Therefore, the read controller 34 supplies the intercept command to the write controllers $31_1$, $31_3$, and $31_4$ to intercept the write operation, and supplies the track jump command to the system controller 50. With reference to the A-time data and the start and end addresses stored in the second areas among the memories $33_1$, $33_3$, and $33_4$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$, $32_3$, and $32_4$ where data were written at the present read cycle, and outputs the read data to the second signal processing circuit 40. In this example, the data from the frame 23:42:60 to the frame 23:44:62 is output.

The write controllers $31_1$, $31_3$, and $31_4$ received the intercept command intercepts the read operation. The system controller 50 received the track jump command controls to jump the optical pickup 2 by the track jump number J=5 from the position VI to a position VII shown in FIG. 12. Thereafter, reading record data resumes. Thereafter, similar operations are repeated to read at high speed desired record data from CD-ROM 1 by using the three beams $3_1$, $3_3$, and $3_4$ and by preventing the record data from being duplicated and omitted.

For example, in order to read the record data from the 19 tracks from the track (x−1) to the track (x+17) shown in FIG. 12, only reading the record data of CD-ROM 1 during eight rotations and one track jump are required. Therefore, the record data can be read more rapidly than data is read with one light beam from CD-ROM 1 during 19 rotations.

Figure 14:
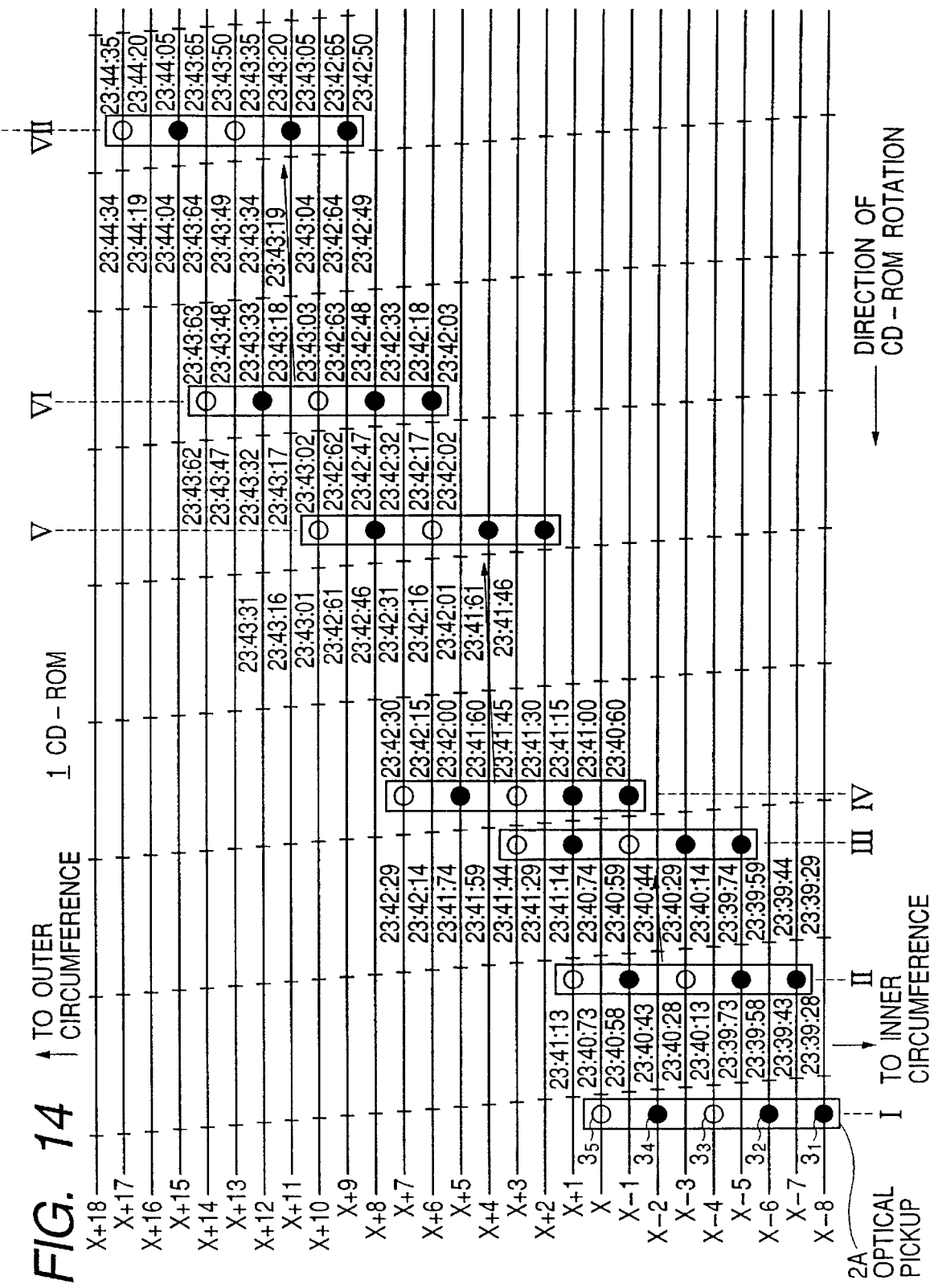
FIG. 14 is a diagram illustrating an example of a data read operation of the CD-ROM read apparatus shown in FIG. 1.

(8) Sixth Specific Read/write Operation (Read Unable by the Light Beams $3_1$, $3_2$, and $3_4$, Refer to FIG. 14)

If the judgement of a presence/absence of a record data unreadable system during one relative rotation of the optical pickup 2 from a position I shown in FIG. 14 relative to CD-ROM 1, shows that there are three record data unreadable systems of the light beams $3_1$, $3_2$, and $3_4$, then reading record data with adjacent two light beam systems is impossible. However, similar to the case shown in FIG. 12, continuously reading record data with data readable light beams during approximately $\{(R+1)\cdot(c+1)\}$ rotations and track jump by (Q−1) track can be repeated if Q is 2 or larger and R is 0 or larger, where Q is the number of tracks representing a distance between the innermost light beam and outermost light beam among the record data readable light beam systems, and R is the maximum number of adjacent record data unreadable light beams between the innermost and outermost record data readable light beams.

In the example shown in FIG. 14, of the record data readable light beam systems, the innermost light beam is the light beam $3_3$ and the outermost light beam is the light beam $3_5$ so that Q=4. In the adjacent record data unreadable light beams between the light beams $3_3$ and $3_5$, the maximum number of adjacent record data unreadable light beams is "1" because there is only the light beam $3_4$. As the h read light beam systems, all the two record data readable light beam systems $3_3$ and $3_5$ are allocated. The continuous read rotation number I is set as I $\{(R+1)(c+1)\}$=4, and the read track jump number J is set to J=(Q−1)=3.

If the optical pickup 2 is at a position II shown in FIG. 14 after the h=2 read light beam systems are allocated and the continuous read number I=4 and read track jump number J=3 are set, the optical pickup 2 is jumped from the position II by two tracks in the forward direction so that the light beams $3_1$, $3_3$, and $3_4$ are focussed in the track-on state on the tracks (x−1), and (x+3). Then, reading the record data on the tracks (x−1), and (x+3) at the same time starts, by using two systems including the photodetector $PD_3$ to first signal processing circuit $26_3$, and photodetector $PD_5$ to first signal processing circuit $26_5$. When all the frame sync detection signals $FS_3$ and $FS_5$ are input from the first signal processing circuits $26_3$ and $26_5$, the specific read/write command including the read system information "3, 5" is supplied to the P/S converter 30.

Thereafter, nearly similar to the case shown in FIG. 12 (in the case shown in FIG. 14, the write controllers $31_3$ and $31_5$ control to write the data $DATA_3$ and $DATA_5$ and A-time data $AT_3$ and $AT_5$ output from the first signal processing circuit $26_3$ and $26_5$, into the memories $32_3$ and $32_5$ and $33_3$ to $33_5$, and with reference to the the A-time data and start and end addresses stored in the memories $33_3$ and $33_5$, the read controller 34 controls to read record data stored in the memories $33_3$ and $33_5$ in the order of At-time by preventing the record data from being duplicated and omitted), an operation of reading record data from CD-ROM 1 by approximately I=4 rotations, jumping the optical pickup by the track jump number J=3, again reading record data from CD-ROM 1 by approximately I=4 rotations, and jumping the optical pickup by the track jump number J=3 is repeated (refer to III to VII in FIG. 14) to sequentially read record data at high speed in the record order by preventing the record data from being duplicated and omitted.

For example, in order to read the record data from the 16 tracks from the track (x−1) to the track (x+14) shown in FIG. 14, only reading the record data of CD-ROM 1 during eight rotations and one track jump are required. Therefore, the record data can be read more rapidly than data is read with one light beam from CD-ROM 1 during 16 rotations.

Figure 15:
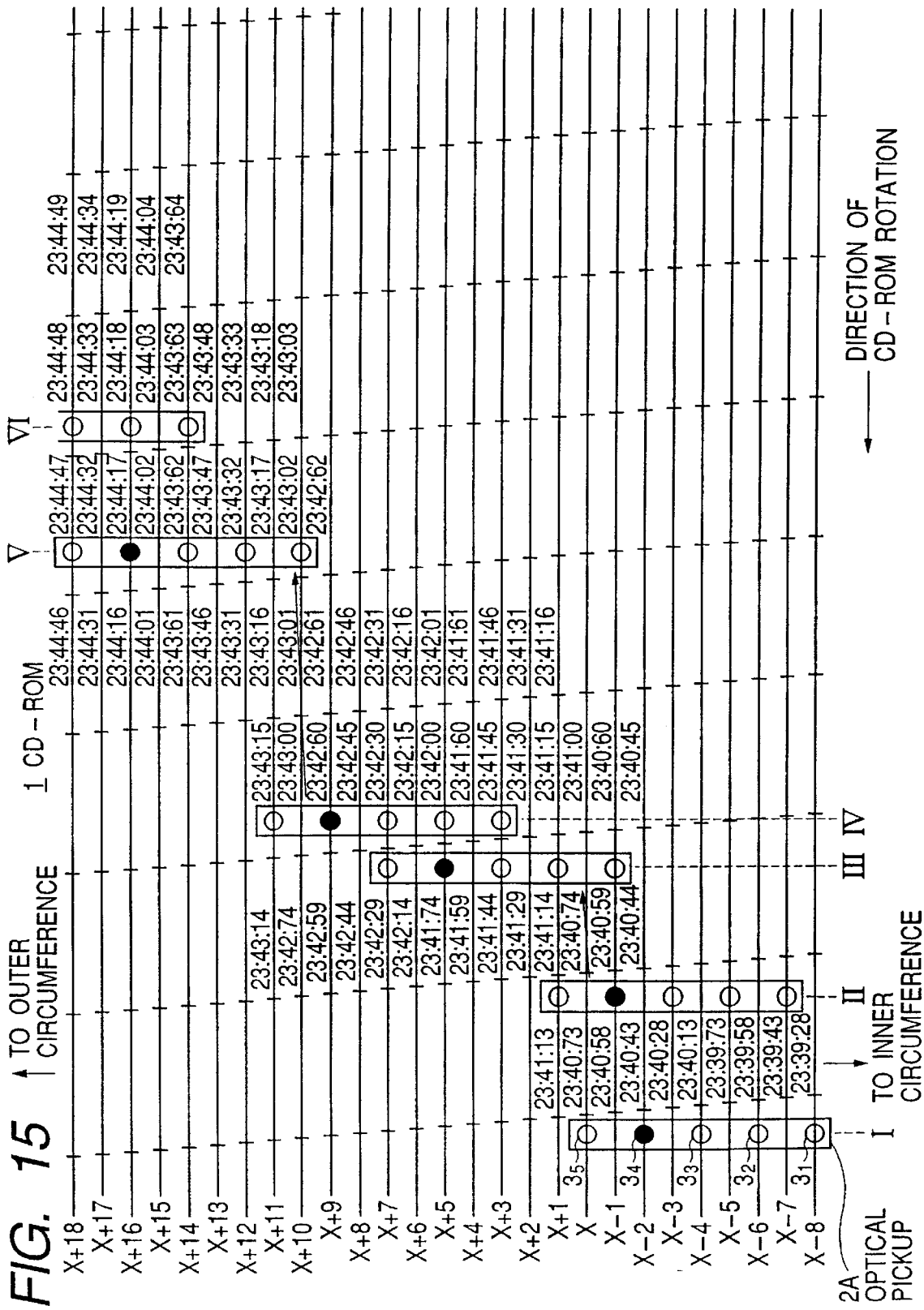
FIG. 15 is a diagram illustrating an example of a data read operation of the CD-ROM read apparatus shown in FIG. 1.

(9) Seventh Specific Read/write Operation (Read Unable by the Light Beam $3_4$, Refer to FIG. 15)

If the judgement of a presence/absence of a record data unreadable system during one relative rotation of the optical pickup 2 from a position I shown in FIG. 15 relative to CD-ROM 1, shows that there is one record data unreadable system of the light beam $3_4$, then reading record data with adjacent three light beam systems is possible as described in the above case (4) (refer to FIG. 8). However, if a similar operation to the case shown in FIG. 12 is incorporated, record data can be read more quickly.

In the example shown in FIG. 15, of the record data readable light beam systems, the innermost light beam is the light beam $3_5$ and the outermost light beam is the light beam $3_5$ so that Q=8. In the adjacent record data unreadable light beams between the light beams $3_1$ and $3_5$, the maximum number of adjacent record data unreadable light beams is R=1 because there is only the light beam $3_4$. As the h read light beam systems, all the four record data readable light beam systems $3_1$ to $3_3$, and $3_5$ are allocated. The continuous read rotation number I is set as $I=\{(R+1)\cdot(c+1)\}4$, and the read track jump number J is set to J=(Q−1)=3.

If the optical pickup 2 is at a position II shown in FIG. 15 after the h=4 read light beam systems are allocated and the continuous read number I=4 and read track jump number J=3 are set, the optical pickup 2 is jumped from the position II shown in FIG. 15 by six tracks in the forward direction so that the light beams $3_1$ to $3_3$, and $3_5$ are focussed in the track-on state on the tracks (x−1), (x+1), (x+3), and (x+7). Then, reading the record data on the tracks (x−1), (x+1), (x+3), and (x+7) at the same time starts, by using four systems including the photodetector $PD_1$ to first signal processing circuit $26_1$, photodetector $PD_2$ to first signal processing circuit $26_2$, photodetector $PD_3$ to first signal processing circuit $26_3$, and photodetector $PD_5$ to first signal processing circuit $26_5$. When all the frame sync detection signals $FS_3$ to $PS_3$, and $FS_5$ are input from the first signal processing circuits $26_1$ to $26_3$ and $26_5$, the specific read/write command including the read system information "1, 2, 3, 5" is supplied to the P/S converter 30.

Thereafter, nearly similar to the case shown in FIG. 12 (in the case shown in FIG. 15, the write controllers $31_1$ to $31_3$, and $31_5$ control to write the data $DATA_1$ to $DATA_3$, and $DATA_5$ and A-time data $AT_1$ to $AT_3$, and $AT_5$ output from the first signal processing circuit $26_1$ to $26_3$, and $26_5$, into the memories $32_1$ to $32_3$, and $32_2$, and $33_1$ to $33_3$, and $33_5$, and with reference to the the A-time data and start and end addresses stored in the memories $33_1$ to $33_3$, and $33_5$, the read controller 34 controls to read record data stored in the memories $33_1$ to $33_3$, and $33_5$ in the order of At-time by preventing the record data from being duplicated and omitted), an operation of reading record data from CD-ROM 1 by approximately I=4 rotations, jumping the optical pickup by the track jump number J=3, again reading record data from CD-ROM 1 by approximately I=4 rotations, and jumping the optical pickup by the track jump number J=3 is repeated (refer to III to VII in FIG. 15) to sequentially read record data at high speed in the record order by preventing the record data from being duplicated and omitted.

For example, in order to read the record data from the 23 tracks from the track (x−1) to the track (x+21) shown in FIG. 15, only reading the record data of CD-ROM 1 during eight rotations and one track jump are required. In contrast, in the case shown in FIG. 8, reading the record data of CD-ROM 1 during eight rotations and three track jumps.

Figure 16:
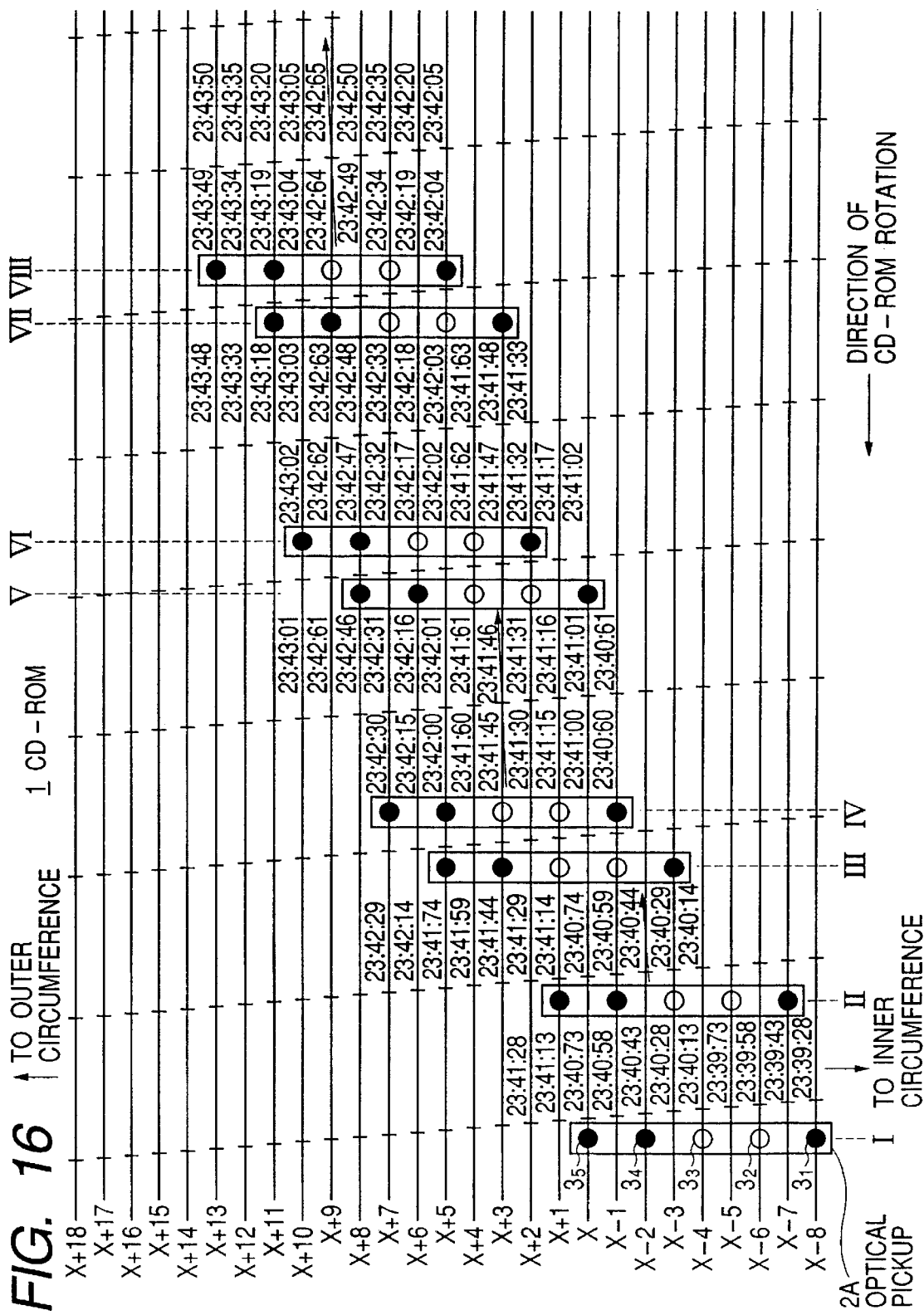
FIG. 16 is a diagram illustrating an example of a data read operation of the CD-ROM read apparatus shown in FIG. 1.
Figure 17:
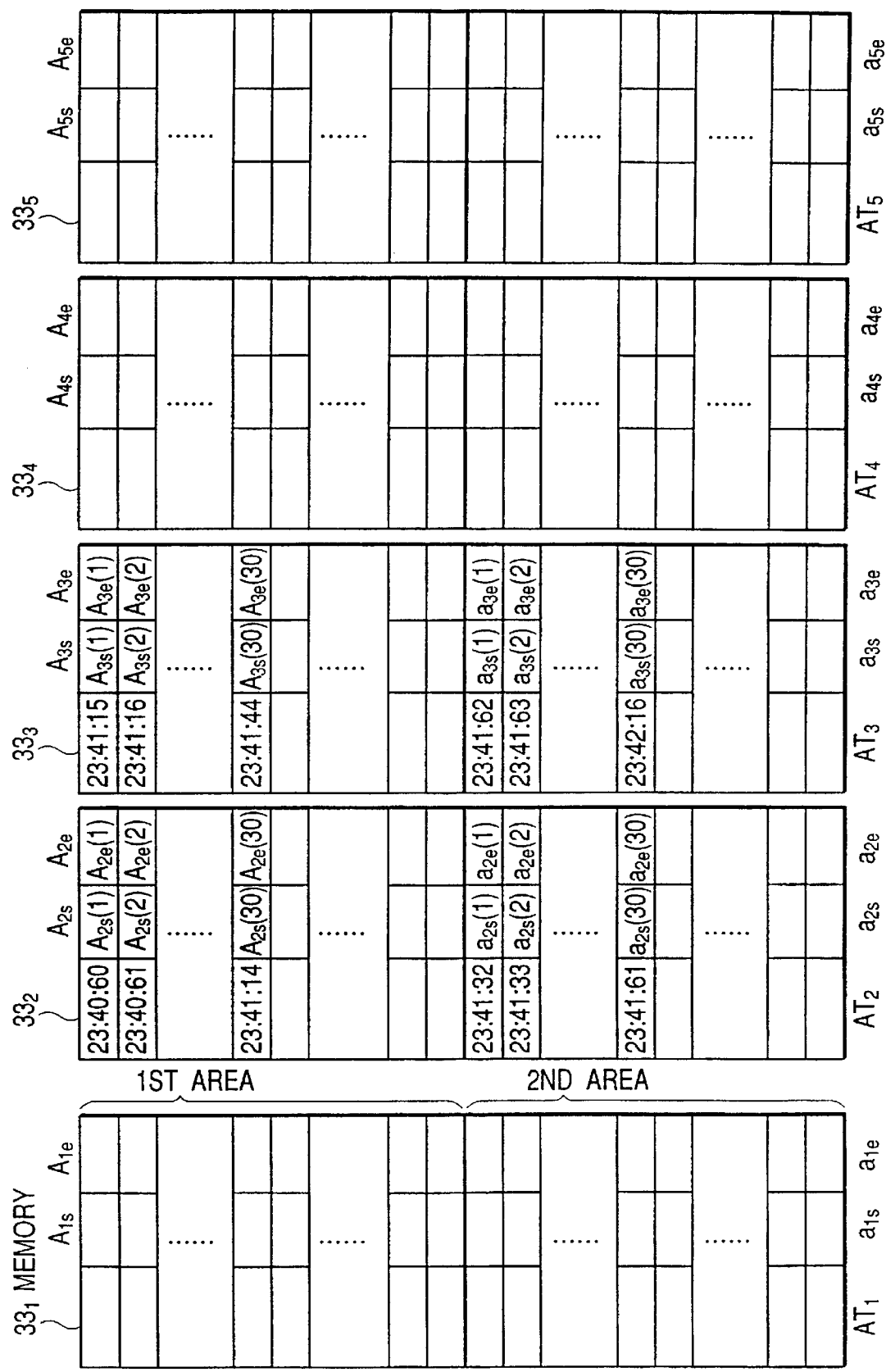
FIG. 17 is a diagram illustrating an example of the contents of the memory shown in FIG. 2.

(10) Eighth Specific Read/write Operation (Read Unable by the Light Beams $3_1$, $3_4$, and $3_5$, Refer to FIGS. 16 and 17)

If the judgement of a presence/absence of a record data unreadable system during one relative rotation of the optical pickup 2 from a position I shown in FIG. 16 relative to CD-ROM 1, shows that there are three record data unreadable systems of the light beams $3_1$, $3_4$, and $3_5$, even with the remaining two adjacent light beams $3_2$ and $3_3$, record data can be read by repetitively performing data read of CD-ROM 1 during two rotations and track jump in the forward direction.

Specifically, continuously reading record data with data readable light beams during approximately $\{(R+1)(c+1)\}$ rotations and track jump by (Q−1) track can be repeated if Q is 2 or larger and R is 0 or larger, where Q is the number of tracks representing a distance between the innermost light beam and outermost light beam among the record data readable light beam systems, and R is the maximum number of adjacent record data unreadable light beams between the innermost and outermost record data readable light beams.

In the example shown in FIGS. 16 and 17, of the record data readable light beam systems, the innermost light beam is the light beam $3_2$ and the outermost light beam is the light beam $3_3$ SO that Q=2. In the adjacent record data unreadable light beams between the light beams $3_2$ and $3_3$, the maximum number of adjacent record data unreadable light beams is R=0 because there is no light beam. As the h read light beam systems, all the two record data readable light beam systems $3_2$ and $3_3$ are allocated. The continuous read rotation number I is set as $I=((R+1)\cdot(c+1))=2$ and the read track jump number J is set to J=(Q−1)=1.

If the optical pickup 2 is at a position II shown in FIG. 16 after the h=4 read light beam systems are located and the continuous read number I=4 and read rack jump number J=3 are set, the optical pickup 2 is jumped from the position II shown in FIG. 16 by four tracks in the forward direction so that the light beams $3_2$ and $3_3$ are focussed in the track-on state on the tracks (x−1) and (x+1). Then, reading the record data on the tracks (x−1) and (x+1) at the same time starts, by using two systems including the photodetector $PD_2$ to first signal processing circuit $26_2$ and photodetector $PD_3$ to first signal processing circuit $26_3$. When all the frame sync detection signals $FS_2$ and $FS_3$ are input from the first signal processing circuits $26_2$ and $26_3$, the specific read/write command including the read system information "2, 3" is supplied to the P/S converter 30.

Upon reception of the specific read/write command via the read controller 34, only the write controllers $31_2$ and $31_3$ indicated by the read system information "2, 3" write one block after another the data $DATA_2$ and $DATA_3$ output from the first signal processing circuits $26_2$ and $26_3$, into the first areas of the memories $32_2$ and $32_3$, and writes the A-time data $AT_2$ and $AT_3$ corresponding to the data $DATA_2$ and $DATA_3$ and the pairs of start addresses $A_{2s}$. and $A_{3s}$ and end addresses $A_{2e}$ and $A_{3e}$ in the memories $32_2$ and $32_3$, into the first areas of the memories $33_2$ and $33_3$. In the example shown in FIG. 16, in the first areas of the memories $33_2$ and $33_3$, the A-time data is written from the frames of 23:40:60 and 23:41:15 (refer to FIG. 17).

The read controller 34 received the specific read/write command checks whether there is no omission of record data read with each read system, by referring to the first areas of the memories $33_2$ and $33_3$ indicated by the read system information "2, 3" and used at the present read cycle to confirm that the A-time one frame before the start A-time data in the first area of the memory $33_3$ is contained in the first area of the memory $33_2$.

After the read operation by the optical pickup 2 is performed approximately I=two rotations (in actual, slightly more than two rotations) and the optical pickup 2 reaches a position IV shown in FIG. 16, the contents of the first areas of the memories $33_2$ and $33_3$ become as shown in FIG. 17 and there is no omission of record data read with the read systems. Therefore, the read controller 34 supplies the intercept command to the write controllers $31_2$ and $31_3$ to intercept the write operation, and supplies the track jump command to the system controller 50. With reference to the A-time data and the start and end addresses stored in the first areas among the memories $33_2$ and $33_3$, the read controller 34 controls to read record data in the order of A-time starting from the oldest A-time, relative to the data stored in the first areas among the memories $32_2$ and $32_3$, and outputs the read data to the second signal processing circuit 40. In this example, the data from the frame 23:40:60 to the frame 23:41:44 is output.

The write controllers $31_2$ and $31_3$ received the intercept command intercepts the read operation, and the system controller 50 received the track jump command supplies the servo circuit 23 with the track jump command indicating a track jump by J=1 track in the forward direction to thereby jump the optical pickup 2 from the position IV to a position V shown in FIG. 16. After the light beams $3_2$ and $3_3$ are focussed in the track-on state on the tracks (x+2) and (x+4), reading record data resumes. When all the frame sync detection signals $FS_2$ and $FS_2$ of H level are output from the first signal processing circuits $26_2$ and $26_3$, the track jump completion notice is read and supplied to the controller 34.

The controller 34 received the track jump completion notice supplies the resume command to the write controllers $31_2$ and $31_3$, and the write controllers $31_2$ and $31_3$ received the resume command write the data $DATA_2$ and $DATA_3$ output from the first signal processing circuits $26_2$ and $26_3$ after the track jump, this time into the second areas of the memories $32_2$ and $32_3$, and writes the A-time data $AT_2$ and $AT_3$ corresponding to the data $DATA_2$ and $DATA_3$ and the pairs of start addresses $a_{2s}$ and $a_{3s}$ and end addresses $a_{2e}$ and $a_{3e}$ in the memories $32_2$ and $32_3$, into the second areas of the memories $33_2$ and $33_3$. In the example shown in FIG. 16, in the second areas of the memories $33_2$ and $33_3$, the A-time data is written from the frames of 23:41:=and 23:41:62 (refer to FIG. 17).

After the read controller 34 supplies the resume command, the read controller 34 checks whether there is no omission of record data read with each read system, by referring to the second areas of the memories $33_2$ and $33_3$ used at the present read cycle to confirm that the A-time one frame before the start A-time data in the second area of the memory $33_3$ is contained in the second area of the memory $33_2$.

After the read operation by the optical pickup 2 is performed approximately I=two rotations (in actual, slightly more than two rotations) and the optical pickup 2 reaches a position VI shown in FIG. 16, the contents of the second areas of the memories $33_1$, $33_3$, and $33_4$ become as shown in FIG. 17 and there is no omission of record data read with the read systems "2, 3". Therefore, the read controller 34 supplies the intercept command to the write controllers $31_2$ and $31_3$ to intercept the write operation, and supplies the track jump command to the system controller 50. With reference to the A-time data and the start and end addresses stored in the second areas among the memories $33_2$ and $33_3$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_2$ and $32_3$ where data were written at the present read cycle, and outputs the read data to the second signal processing circuit 40. In this example, the data from the frame 23:41:45 to the frame 23:42:16 is output.

The write controllers $31_2$ and $31_3$ received the intercept command intercepts the read operation. The system controller 50 received the track jump command controls to jump the optical pickup 2 by the track jump number J=1 from the position VI to a position VII shown in FIG. 16. Thereafter, reading record data resumes. Thereafter, similar operations are repeated to read at high speed desired record data from CD-ROM 1 by using the three beams $3_2$ and $3_3$ and by preventing the record data from being duplicated and omitted.

Figure 18:
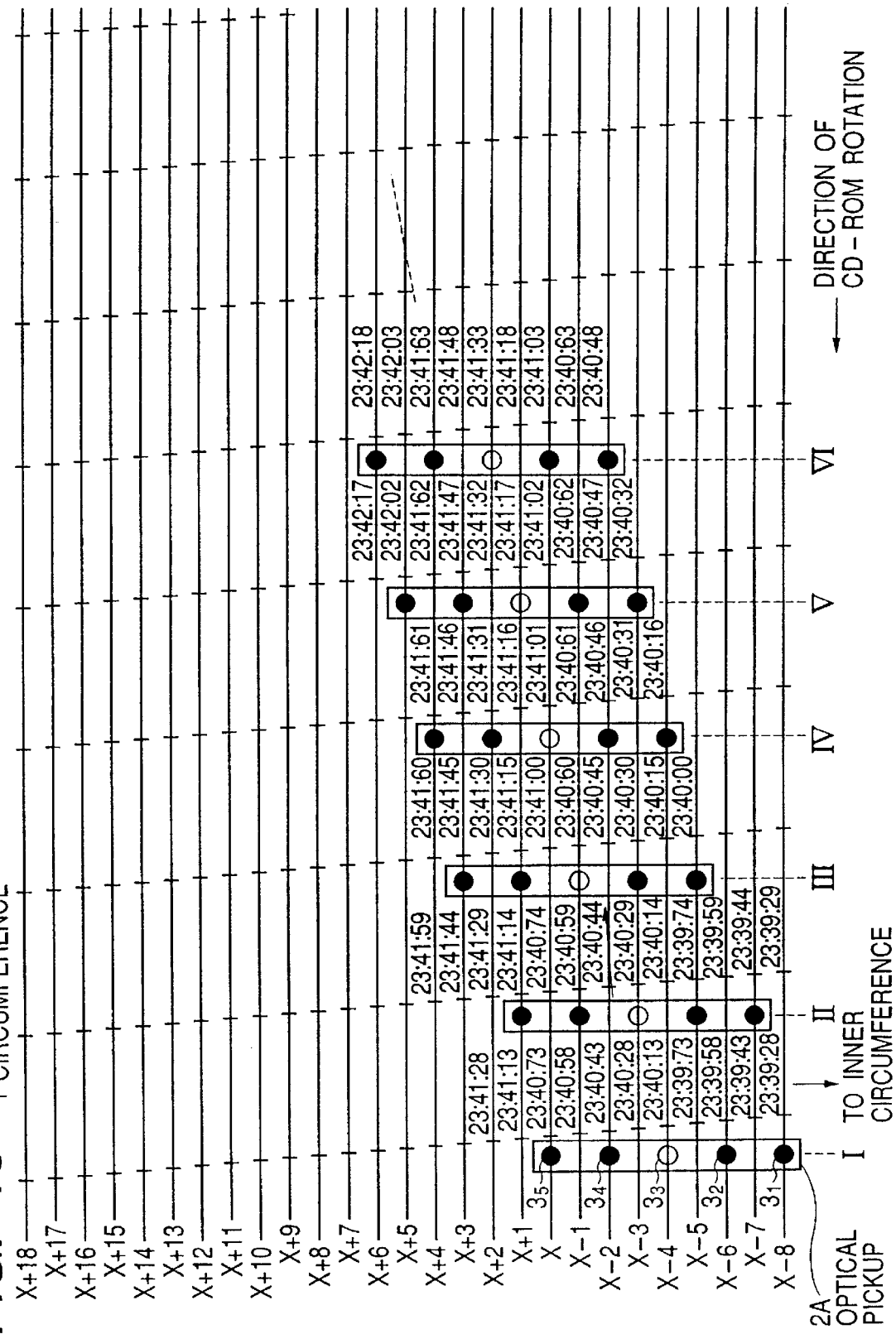
FIG. 18 is a diagram illustrating an example of a data read operation of the CD-ROM read apparatus shown in FIG. 1.
Figure 19:
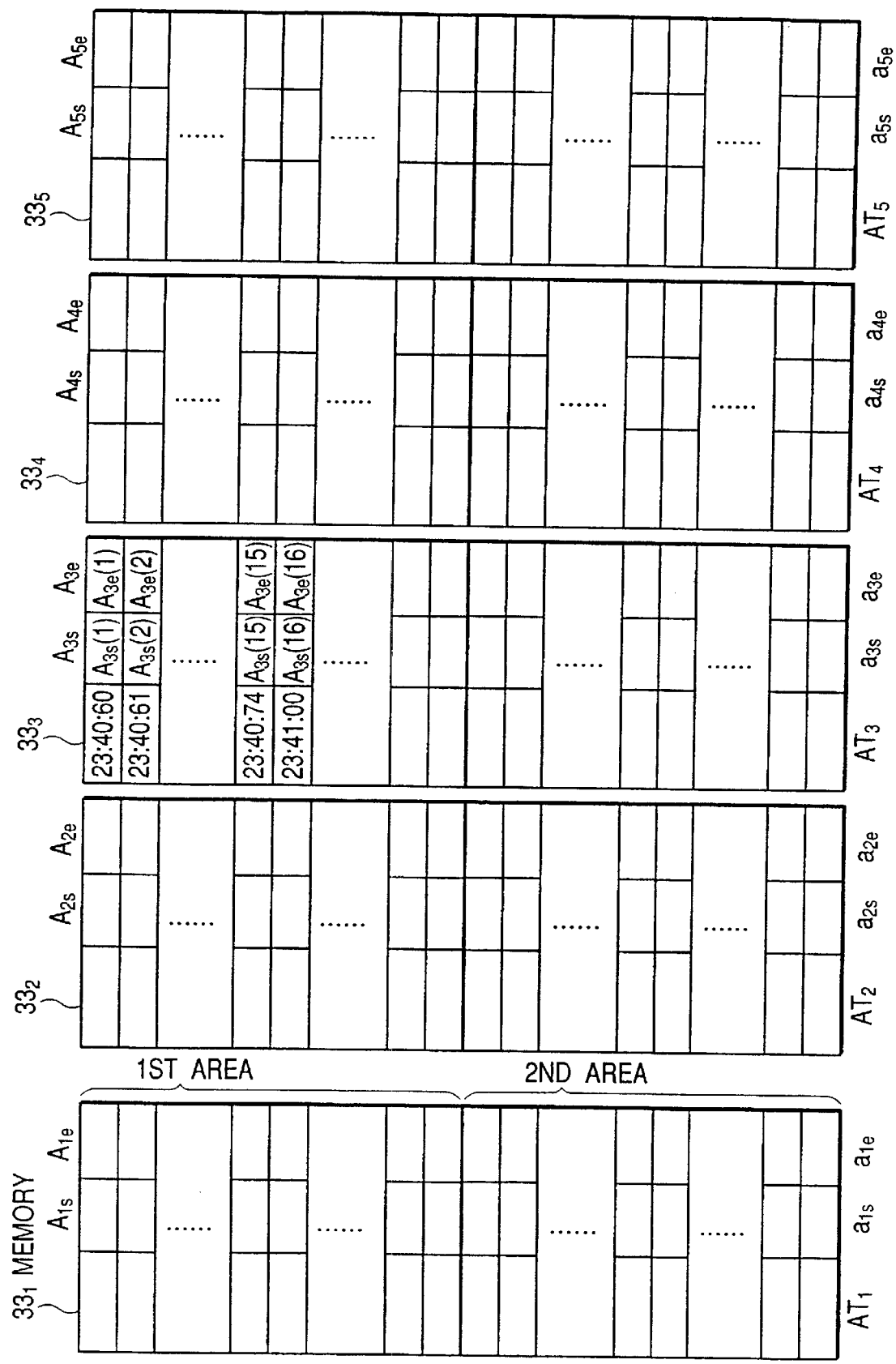
FIG. 19 is a diagram illustrating an example of the contents of the memory shown in FIG. 2.

(11) Ninth Specific Read/write Operation (Read Unable by the Light Beams $3_1$, $3_2$, $3_4$, and $3_5$, Refer to FIGS. 18 and 19)

If the judgement of a presence/absence of a record data unreadable system during one relative rotation of the optical pickup 2 from a position I shown in FIG. 18 relative to CD-ROM 1, shows that there are four record data unreadable systems of the light beams $3_1$, $3_2$, $3_4$, and $3_5$, record data is omitted if it is read with only one light beam $3_3$ by repetitively performing data read of CD-ROM 1 during two rotations or more and track jump in the forward direction. In this case, record data is continuously read from CD-ROM 1 by using the record data readable one light beam system.

Specifically, as the h read light beam systems, the record data readable light beam $3_3$ is allocated. The continuous read rotation number I is set as infinite, and the read track jump number J is set to J=0.

If the optical pickup 2 is at a position II shown in FIG. 18 after the h=1 read light beam system is allocated and the continuous read number I=infinite and read track jump number J=1 are set, the optical pickup 2 is jumped from the position II shown in FIG. 18 by two tracks in the forward direction so that the light beams $3_3$ is focussed in the track-on state on the track (x−1). Then, reading the record data on the track (x−1) starts, by using one system of the photodetector $PD_3$ to first signal processing circuit $26_3$. When the frame sync detection signal $FS_3$ is input from the first signal processing circuits $26_3$, the specific read/write command including the read system information "3" is supplied to the P/S converter 30.

Upon reception of the specific read/write command via the read controller 34, only the write controller $31_3$ indicated by the read system information "3" writes one block after another the data $DATA_3$ output from the first signal processing circuits $26_3$, into the first area of the memory $32_3$, and writes the A-time data $AT_3$ corresponding to the data $DATA_3$ and the pairs of start addresses $A_{3s}$ and end addresses $A_{3e}$ in the memory $32_3$, into the first area of the memory $33_3$. In the example shown in FIG. 18, in the first area of the memory $33_3$, the A-time data is written from the frame of 23:40:60 (refer to FIG. 19). After data is written in the end regions of the first areas of the memories $32_3$ and $33_3$, the start regions of the first areas are automatically reserved for continuing data write.

Since only one piece of the read system information "3" is used, the read controller 34 received the specific read/write command refers to the first areas of the memories $33_3$ indicated by the read system information "3" and used at the present read cycle, and controls to read record data in the order of A-time starting from the oldest A-time, relative to the data stored in the first areas of the memory $32_3$, and outputs the read data to the second signal processing circuit 40, without issuing the intercept command and track jump command. Therefore, during data read, the optical pickup 2 will not jump (refer to III to VI in FIG. 18), and as CD-ROM 1 rotates, the record data after the track (x−1) can be read with the light beam $3_3$ system without any omission of record data and supplied to the second signal processing circuit 40.

In the above embodiments, different beams $3_1$ to $3_n$ are applied at the same time to every (c+1)-th tracks of CD-ROM 1, where c=1 and n=5. The invention is not limited only to the above embodiments, other combinations of c and n may also be used if c is an integer "1" or larger and n is an integer "2" or larger. For example, an optical pickup 2B shown in FIG. 20-1 may apply three light beams 31 to $3_3$ to tracks at every second, or an optical pickup 2C shown in FIG. 20-2 may apply three light beams $3_1$ to $3_3$ to tracks at every third.

With the optical pickup shown in FIG. 20-1, if there is no record data unreadable light beam system, record data of CD-ROM 1 is read by repeating an operation of continuous read of the record data with three light beam systems $3_1$ to $3_3$ during approximately (c+1)=2 rotations of CD-ROM 1 and track jump by $\{(c+1)(n-1)-1\}=3$ tracks in the forward direction after it is confirmed that there is no omission of record data read from CD-ROM 1 with a combination of three light beams $3_1$ to $3_3$. Similarly, with the optical pickup shown in FIG. 20-2, if there is no record data unreadable light beam system, record data of CD-ROM 1 is read by repeating an operation of continuous read of the record data with three light beam systems $3_5$ to $3_3$ during approximately (c+1)=3 rotations of CD-ROM 1 and track jump by $((c+1)(n-1)-1)=5$ tracks in the forward direction after it is confirmed that there is no omission of record data read from CD-ROM 1 with a combination of three light beams $3_1$ to $3_3$.

With the optical pickup shown in FIG. 20-1, if there is a record data unreadable light beam system, e.g., the light beam system $3_3$, M is "2" including the two light beams $3_1$ and $3_2$ where M is the maximum number of adjacent record data readable light beam systems among the remaining light beam systems. The M=2 light beams systems $3_1$ and $3_2$ are allocated as the read light beam systems. In this case, record data of CD-ROM 1 is read by repeating an operation of continuous read of the record data with the allocated two light beam systems $3_1$ and $3_2$ during approximately (c+1) =2 rotations of CD-ROM 1 and track jump by $\{(c+1)\cdot(M-1)-1\}=1$ track in the forward direction after it is confirmed that there is no omission of record data read from CD-ROM 1 with a combination of two light beams $3_1$ and $3_2$.

Similarly, with the optical pickup shown in FIG. 20-2, if there is a record data unreadable light beam system, .e.g., the light beam system $3_3$, M is "2" including the two light beams $3_1$ and $3_2$ where M is the maximum number of adjacent record data readable light beam systems among the remaining light beam systems. The M=2 light beams systems $3_1$ and $3_2$ are allocated as the read light beam systems. In this case, record data of CD-ROM 1 is read by repeating an operation of continuous read of the record data with the allocated two light beam systems $3_1$ and $3_2$ during approximately (c+1)=3 rotations of CD-ROM 1 and track jump by $\{(c+1)\cdot(M-1)-1\}=2$ tracks in the forward direction after it is confirmed that there is no omission of record data read from CD-ROM 1 with a combination of two light beams $3_1$ and $3_2$.

In the description of the case (3) (refer to FIGS. 6 and 7), the light beam system $3_5$ is unable to read record data and the maximum number M of adjacent record data readable light beam systems is "4" and M≧2. Therefore, as the h record data light beams systems, the M=4 light beams $3_1$ to $3_4$ are allocated, and the continuous read rotation number I is set to I=(c+1)=2, and the track jump number J is set to J=$\{(c+1)\cdot(M-1)-1\}$5. Instead, the continuous read rotation number I may be set to I=$\{(R+1)\cdot(c+1)\}=2$ and the track jump number J may be set to J=(Q−1)=5, where Q is the number of tracks representing a distance between the innermost light beam and outermost light beam among the allocated h=4 record data readable light beam systems $3_1$ to $3_4$ and in this case Q=6, and R is the maximum number of adjacent record data unreadable light beams between the innermost and outermost record data readable light beams among the the allocated h=4 record data readable light beam systems $3_1$ to $3_4$ and in this case R=0.

In the description of the case (4) (refer to FIGS. 8 and 9), the light beam system $3_4$ is unable to read record data and the maximum number M of adjacent record data readable light beam systems is "3". Therefore, as the h record data light beams systems, the M=3 light beams $3_1$ to $3_3$ are allocated, and the continuous read rotation number I is set to I=(C+1)=2, and the track jump number J is set to J=$\{(c+1)\cdot(M-1)-1\}=3$. Instead, the continuous read rotation number I may be set to I=$\{(R+1)\cdot(c+1)\}=2$ and the track jump number J may be set to J=(Q−1)=3, where Q is the number of tracks representing a distance between the innermost light beam and outermost light beam among the allocated h record data readable light beam systems $3_1$ to $3_3$ and in this case Q=4, and R is the maximum number of adjacent record data unreadable light beams between the innermost and outermost record data readable light beams among the the allocated h record data readable light beam systems $3_1$ to $3_3$ and in this case R=0.

Similarly, in the cases ((5) or (6), the continuous read rotation number I may be set to I=$\{(R+1)\cdot(c+1)\}=2$ and the track jump number J may be set to J=(Q−1)=3, where Q is the number of tracks representing a distance between the innermost light beam and outermost light beam among the allocated h=3 record data readable light beam systems $3_1$ to $3_3$ or $3_2$ to $3_4$ and in this case Q=4, and R is the maximum number of adjacent record data unreadable light beams between the innermost and outermost record data readable light beams among the the allocated h=3 record data readable light beam systems $3_1$ to $3_3$ or $3_2$ to $3_4$ and in this case R=0.

In the description of the case (10) (refer to FIGS. 16 and 17), there are three record data unreadable light beam systems $3_1$, $3_4$, and $3_5$, the continuous read rotation number I is set to I={(R+1)·(c+1)}=2 and the track jump number 3 may be set to J=(Q−1)=1, where Q is the number of tracks representing a distance between the innermost light beam and outermost light beam among the record data readable light beam systems $3_2$ and $3_3$ and in this case Q=2, and R is the maximum number of adjacent record data unreadable light beams between the innermost and outermost record data readable light beams among the the allocated record data readable light beam systems and in this case R=0. Instead, since the maximum number M of adjacent record data readable light beam systems is "2", as the h record data light beams systems, the M=2 light beams $3_2$ and $3_3$ may be allocated, and the continuous read rotation number I may be set to I=(c+1)=2, and the track jump number J may be set to J {(c+1)·(M−1)−1}=1.

In the above embodiments, a presence/absence of a record data unreadable light beam system is judged at the track position one track before the read start point designated by the host computer, and in accordance with the judgement result, the h read light beam systems, the continuous read rotation number I, and the track jump number J are set. Thereafter, the optical head is jumped to the track immediately before the read start point to start reading record data. Instead, a presence/absence of a record data unreadable light beam system may be judged at the track position containing the read start point, or at the lead-in of the innermost circumference of CD-ROM 1.

In the cases (3) to (9) and the case shown in FIG. 20, if it is judged that there is some record data unreadable light beam systems, the system controller 50 selects from the remaining record data readable light beam systems a combination of two or more light beam systems, and allocates the combination as as the h read light beam systems, to thereafter set the continuous read rotation number I and the track jump number J in accordance with predetermined rules. However, the continuous read rotation number R when the continuous read of CD-ROM 1 with a combination of the allocated h read light beam systems is performed until omission of the record data becomes none, can be automatically determined as approximately {(R+1) (c+1)} where R is the maximum number of adjacent record data unreadable light beams between the innermost and outermost record data readable light beams among the the h read light beam systems. Therefore, only the track jump number J may be set. The continuous read rotation number when the continuous read of CD-ROM 1 with a combination of all the n optical light beam systems is performed until omission of the record data becomes none, can also be automatically determined as approximately (c+1).

Also in the above embodiments, although CD-ROM is rotated at a constant linear velocity, it may be rotated at a constant angular velocity (CAV). Other optical discs with a spiral track of the type different from CD-ROM may also be used such as CD-WO, DVD, DVD-ROM and DVD-RAM.

What is claimed is:

1. An optical disc read method of reading data recorded on tracks of an optical disc formed with a spiral track with n light beam systems for applying different light beams 1, ..., i, ..., n at the same time to n tracks at every (c+1)-th and independently detecting the light beams reflected from the optical disc, where c is an integer of 1 or larger and n is an integer of 2 or larger, characterized in that;

if there is a light beam system or systems incapable of reading the record data of the optical disc, the record data of the optical disc is read by alternately performing a continuous reading operation for approximately (c+1) rotations and a track jump operation for approximately {(c+1)·M−1)−1} tracks in a forward direction after said continuous reading operation, by only using detection outputs from a group of M (M<n) adjacently arranged light beam systems capable of reading the record data.

2. An optical disc read method according to claim 1, wherein said group is the most populous group of adjacently arranged light beam system capable of reading the record data.

3. An optical disc read method of reading data recorded on tracks of an optical disc formed with a spiral track with n beam systems for applying different light beams 1, i, ..., n at the same time to n tracks at every (c+1)-th and independently detecting the light beams reflected from the optical disc, where c is an integer of 1 or larger and n is an integer of 2 or larger, characterized in that;

if there is a light beam system or systems incapable of reading the record data of the optical disc, where Q is the number of tracks representing a distance between the innermost light beam system and outermost light beam system among light beam systems capable of reading the record data and R is the number of the most populous group of adjacently arranged light beam systems incapable of reading the record data between the innermost and outermost light beams systems able to read the record data, the record data of the optical disc is read by alternately performing a continuous reading operation for approximately {(R+1)·(c+1)} rotations and a track jump operation for approximately (Q−1) tracks in a forward direction after said continuous reading operation, by using detection output from the light beam systems capable of reading the record data.

4. An optical disc read method according to claim 3, wherein the record data detected from the tracks of the optical disc during said continuous reading operation is stored together with frame addresses, and said track jump operation is performed when a frame address corresponding to the record data read with the i-th light beam becomes continuous with a continuous data read start frame address corresponding to the record data to be read with the adjacent (i+1)-th light beam.

5. An optical disc read apparatus comprising:

n light beam systems for applying different light beams 1, ..., i, ..., n at the same time to n tracks at every (c+1)-th of an optical disc with a spiral track and independently detecting the light beams reflected from the optical disc, where c is an integer of 1 or larger and n is an integer of 2 or larger, and for reading record data recorded on the optical disc independently for each of n light beams; and read control means for controlling said light beam systems to read the record data of the optical disc by alternately performing a continuous reading operation and a track jump operation, characterized in that;

said control means controls said light beam systems so that if there is a light beam system or systems incapable of reading the record data of the optical disc, the record data of the optical disc is read by alternately performing a continuous reading operation for approximately $(c+1)$ rotations and a track jump operation for approximately $\{(c+1)\cdot(M-1)-1\}$ tracks in a forward direction after said continuous reading operation, by only using detection outputs from a group of M (M<n) adjacently arranged light beam systems capable of reading the record data.

6. An optical disc read apparatus comprising:

n light beam systems for applying different light beams 1, ..., i, n at the same time to n tracks at every $(c+1)$-th of an optical disc with a spiral track and independently detecting the light beams reflected from the optical disc, where c is an integer of 1 or larger and n is an integer of 2 or larger, and for reading record data recorded on the optical disc independently for each of n light beams; and read control means for controlling said light beam systems to read the record data of the optical disc by alternately performing a continuous reading operation and a track jump operation, characterized in that;

said control means controls said light beam systems so that if there is a light beam system or systems incapable of reading the record data of the optical disc, where Q is the number of tracks representing a distance between the innermost light beam system and outermost light beam system among light beam systems capable of reading the record data and R is the number of the most populous group of adjacently arranged light beam systems incapable of reading the record data between the innermost and outermost light beam systems able to read the record data, the record data of the optical disc is read by alternately performing a continuous reading operation for approximately $\{(R+1)\cdot(c+1)\}$ rotations and a track jump operation for approximately $(Q-1)$ tracks in a forward direction after said continuous reading operation, by using detection output from the light beam systems capable of reading the record data.

* * * * *